US009179113B2

(12) United States Patent
Tachi

(10) Patent No.: US 9,179,113 B2
(45) Date of Patent: Nov. 3, 2015

(54) IMAGE PROCESSING DEVICE, AND IMAGE PROCESSING METHOD, AND PROGRAM

(75) Inventor: Masayuki Tachi, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 14/238,225

(22) PCT Filed: Jun. 29, 2012

(86) PCT No.: PCT/JP2012/066670
§ 371 (c)(1),
(2), (4) Date: Feb. 11, 2014

(87) PCT Pub. No.: WO2013/031367
PCT Pub. Date: Mar. 7, 2013

(65) Prior Publication Data
US 2014/0253808 A1 Sep. 11, 2014

(30) Foreign Application Priority Data

Aug. 31, 2011 (JP) ................................. 2011-190052
Dec. 29, 2011 (JP) ................................. 2011-290332

(51) Int. Cl.
H04N 5/228 (2006.01)
H04N 9/64 (2006.01)
(Continued)

(52) U.S. Cl.
CPC ................. *H04N 9/64* (2013.01); *H04N 9/045* (2013.01); *H04N 2101/00* (2013.01)

(58) Field of Classification Search
CPC .......... H04N 5/23229; H04N 5/23232; H04N 5/23253; H04N 9/04; H04N 9/045; H04N 2209/045; H04N 2209/046; H04N 9/64

USPC ........................................ 348/222.1, 272, 273
See application file for complete search history.

(56) References Cited

U.S. PATENT DOCUMENTS 6,781,626 B1 * 8/2004 Wang ............................. 348/273
2007/0110319 A1 * 5/2007 Wyatt et al. .................... 382/199
2007/0116375 A1 5/2007 Utsugi et al.
(Continued)

FOREIGN PATENT DOCUMENTS

JP 11-029880 A 2/1999
JP 2000-069491 A 3/2000
(Continued)

Primary Examiner — Sinh Tran
Assistant Examiner — Zhenzhen Wu
(74) Attorney, Agent, or Firm — Hazuki International, LLC

(57) ABSTRACT

To provide a device and a method for executing remosaic processing for performing conversion into an image of a different pixel array.
Remosaic processing for inputting, as an input image, a mosaic image in which pixel blocks configured of a plurality of same-color pixels are arrayed, and converting the pixel array of the input image into a different pixel array is executed. In this remosaic processing, from among constituent pixels of the input image, pixel value gradients in eight directions in a conversion-target pixel location that is targeted for color conversion processing are detected, an interpolated pixel value calculation mode for the conversion-target pixel is decided on the basis of the pixel value gradients in the eight directions, and an interpolated pixel value for the conversion-target pixel location is calculated in accordance with the decided processing mode. For example, an image having a quadripartite Bayer-type RGB array in which colors of a Bayer-type RGB array are implemented as an array of 2×2 pixel units is converted into a Bayer array.

9 Claims, 19 Drawing Sheets

(51) Int. Cl.
*H04N 9/04* (2006.01)
*H04N 101/00* (2006.01)

(56) References Cited

U.S. PATENT DOCUMENTS

| | | | |
|---|---|---|---|
| 2008/0062409 A1 | 3/2008 | Utsugi | |
| 2008/0088857 A1* | 4/2008 | Zimmer et al. | 358/1.6 |
| 2009/0128662 A1* | 5/2009 | Moon et al. | 348/231.99 |
| 2009/0263017 A1* | 10/2009 | Tanbakuchi | 382/167 |
| 2010/0141812 A1 | 6/2010 | Hirota | |
| 2011/0050918 A1 | 3/2011 | Tachi | |
| 2012/0076420 A1* | 3/2012 | Kono et al. | 382/199 |
| 2013/0216130 A1* | 8/2013 | Saito et al. | 382/165 |

FOREIGN PATENT DOCUMENTS

| | | |
|---|---|---|
| JP | 2010-136225 A | 6/2010 |
| JP | 2011-055038 A | 3/2011 |
| WO | WO 2005/101854 A1 | 10/2005 |

\* cited by examiner

*FIG. 1*

(1) BAYER (Bayer) ARRAY (2) QUADRIPARTITE BAYER-TYPE RGB ARRAY (3) WRGB-TYPE ARRAY

*FIG. 6*

DIRECTION DETERMINATION 2

REFERENCE MADE IN
HORIZONTAL/VERTICAL DIRECTIONS
BETWEEN DIFFERENT COLORS.
(BETTER IF WB IS ADJUSTED AT THIS TIME)

FIG. 12

CALCULATION OF D2-DIRECTION GRADIENT (gradD2)

DIRECTION DETERMINATION DETAILS (D2)

gradD2_center gradD2_high $$gradD2\_low(2,2) = \{abs(I(2,1)-I(5,2))+abs(I(1,2)-I(4,3))\times 2+abs(I(0,3)-I(3,4))\}\times 0.25$$

$$gradD2\_high(2,2) = \begin{bmatrix} abs\{I(0,2)\times 0.333+I(0,3)\times 0.667)-I(1,3)\} \\ +abs\{I(4,2)\times 0.333+I(4,3)\times 0.667)-I(5,3)\} \\ +abs\{I(2,0)\times 0.333+I(2,1)\times 0.667)-I(3,1)\} \\ +abs\{I(2,4)\times 0.333+I(2,5)\times 0.667)-I(3,5)\} \end{bmatrix} \times 0.25$$

$$gradD2(2,2) = gradD2\_low(2,2)\times a_{D2} + gradD2\_high(2,2)\times b_{D2}$$

FIG. 13

CALCULATION OF A3-DIRECTION GRADIENT (gradA3)

DIRECTION DETERMINATION DETAILS (A3)

gradA3_center gradA3_high $gradA3\_low(2,2) = \{abs(I(1,3) - I(2,0)) + abs(I(2,4) - I(3,1)) \times 2 + abs(I(3,5) - I(4,2))\} \times 0.25$ $gradA3\_high(2,2) = \begin{bmatrix} abs\{I(1,2) \times 0.333 + I(0,2) \times 0.667) - I(0,3)\} \\ + abs\{I(5,2) \times 0.333 + I(4,2) \times 0.667) - I(4,3)\} \\ + abs\{I(3,0) \times 0.333 + I(2,0) \times 0.667) - I(2,1)\} \\ + abs\{I(3,4) \times 0.333 + I(2,4) \times 0.667) - I(2,5)\} \end{bmatrix} \times 0.25$ $gradA3(2,2) = gradA3\_low(2,2) \times a_{A3} + gradA3\_high(2,2) \times b_{A3}$

FIG. 15

G INTERPOLATION FOR RB LOCATIONS (2, 2 PHASE)

$itp\_GH = I(1,2) \times 1.25 - I(5,2) \times 0.25$ $itp\_GV = I(2,1) \times 1.25 - I(2,5) \times 0.25$ $itp\_GA = I(1,3) \times 0.5 + I(3,1) \times 0.5$ $itp\_GD = I(1,2) \times 0.375 + I(3,4) \times 0.125$
$+ I(2,1) \times 0.375 + I(4,3) \times 0.125$ $itp\_GA2 = I(0,2) \times 0.1875 + I(3,1) \times 0.3125$
$+ I(1,3) \times 0.3 + I(4,2) \times 0.2$ $itp\_GD2 = I(5,2) \times 0.225 + I(2,1) \times 0.025$
$+ I(1,2) \times 0.525 + I(4,3) \times 0.225$ $itp\_GA3 = I(2,0) \times 0.2 + I(1,3) \times 0.3$
$+ I(3,1) \times 0.1875 + I(2,4) \times 0.3125$ $itp\_GD3 = I(2,1) \times 0.525 + I(3,4) \times 0.225$
$+ I(1,2) \times 0.225 + I(2,5) \times 0.025$

FIG. 16

G INTERPOLATION FOR RB LOCATIONS (3, 2 PHASE)

$itp\_GH = I(4,2) \times 1.25 - I(0,2) \times 0.25$ $itp\_GV = I(3,1) \times 1.25 - I(3,5) \times 0.25$ $itp\_GA = I(3,1) \times 0.375 + I(1,3) \times 0.125$
$\quad + I(4,2) \times 0.375 + I(2,4) \times 0.125$ $itp\_GD = I(2,1) \times 0.5 + I(4,3) \times 0.5$ $itp\_GA2 = I(0,2) \times 0.025 + I(3,1) \times 0.225$
$\quad + I(1,3) \times 0.225 + I(4,2) \times 0.525$ $itp\_GD2 = I(5,2) \times 0.3125 + I(2,1) \times 0.1875$
$\quad + I(1,2) \times 0.2 + I(4,3) \times 0.3$ $itp\_GA3 = I(3,1) \times 0.525 + I(2,4) \times 0.225$
$\quad + I(4,2) \times 0.225 + I(3,5) \times 0.025$ $itp\_GD3 = I(2,1) \times 0.3125 + I(3,4) \times 0.1875$
$\quad + I(3,0) \times 0.2 + I(4,3) \times 0.3$

FIG. 17

G INTERPOLATION FOR RB LOCATIONS (2, 3 PHASE)

FIG. 18

G INTERPOLATION FOR RB LOCATIONS (3, 3 PHASE)

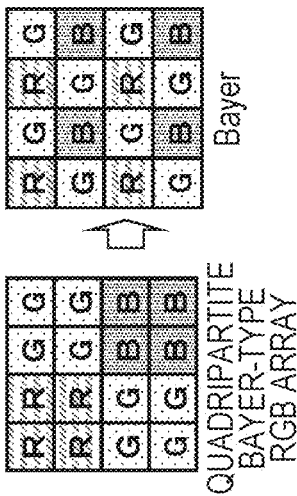

IMAGE PROCESSING DEVICE, AND IMAGE PROCESSING METHOD, AND PROGRAM

TECHNICAL FIELD

The present disclosure relates to an image processing device, and an image processing method, and a program, and particularly relates to an image processing device, and an image processing method, and a program that execute remosaic processing for an image.

BACKGROUND ART

Imaging elements used in imaging devices such as digital cameras are configured such that a color filter made up of an RGB array for example is mounted thereon, and specific wavelength light is incident upon pixels.

Specifically, a color filter having a Bayer array for example is often used.

A Bayer-array captured image is what is known as a mosaic image in which only pixel values corresponding to any of the RGB colors are set to the pixels of an imaging element. A signal processing unit of a camera carries out demosaic processing and so forth in which various signal processing such as pixel value interpolation is carried out with respect to this mosaic image and all pixel values for RGB are set to the pixels, and a color image is generated and output.

Many studies have already been carried out with regard to signal processing for captured images for which a color filter according to this Bayer array is provided, and this signal processing can, to an extent, be said to be technically established. However, at present, sufficient studies have not yet been carried out with regard to signal processing for images having an array that is different from a Bayer array.

Signal processing in general cameras is often set to be executed with respect to Bayer array images, and if the pixel array of the imaging element is an array that is different from a Bayer array, it is possible to apply known signal processing by converting the pixel array of an image that is input from the imaging element into a Bayer array and inputting this to a camera signal processing unit.

Therefore, with regard to a captured image of a pixel array other than a Bayer array, it is preferable to execute processing for converting an input image from the imaging element into a Bayer array as preliminary processing prior to inputting to the camera signal processing unit. This kind of pixel array conversion processing is called "remosaic processing". However, there are various arrays for imaging element pixel arrays, and there is no conventional technology that sufficiently discloses optimal remosaic processing with respect to these various pixel arrays.

It should be noted that configurations having an array that is different from a Bayer array are described in, for example, Patent Document 2 (JP 11-29880 A) and Patent Document 3 (JP 2000-69491 A).

In these Patent Documents 2 and 3, settings are implemented with which a plurality of same-color pixels, such as R pixels having 2×2 pixels, G pixels having 2×2 pixels, and B pixels having 2×2 pixels, are arranged in an imaging element (image sensor), the constituent pixels having 2×2 pixels of the same color are set to different exposure times, and photographing is executed. Patent Documents 2 and 3 describe configurations in which same-color pixel values of different exposure times captured by means of this kind of image sensor are synthesized, and wide dynamic range images are obtained.

However, these documents describe the generation of wide dynamic range images based on the synthesis of pixel values of a plurality of different exposure times, and a clear explanation with respect to remosaic processing is not disclosed.

CITATION LIST

Patent Documents

Patent Document 1: JP 2011-055038 A
Patent Document 2: JP 11-29880 A
Patent Document 3: JP 2000-69491 A

SUMMARY OF THE INVENTION

Problems to be Solved by the Invention

The present disclosure takes for example the abovementioned problem into consideration, and an objective thereof is to provide an image processing device, and an image processing method, and a program that execute image processing, particularly optimal remosaic processing, for images captured by an imaging element which is provided with a color filter having an array that is different from a Bayer array.

Solutions to Problems

A first aspect of the present disclosure is an image processing device including an image signal correction unit that executes correction processing for a pixel signal of an input image, wherein the image signal correction unit inputs, as the input image, a mosaic image in which pixel blocks configured of a plurality of same-color pixels are arrayed, from among constituent pixels of the input image, detects pixel value gradients in eight directions in a conversion-target pixel location that is targeted for color conversion processing, decides an interpolated pixel value calculation mode for the conversion-target pixel on the basis of the pixel value gradients in the eight directions, and calculates an interpolated pixel value for the conversion-target pixel location in accordance with the decided processing mode.

Further, in one embodiment of an image processing device of the present disclosure, the image signal correction unit executes remosaic processing for inputting, as the input image, a mosaic image in which pixel blocks configured of a plurality of same-color pixels are arrayed, and converting the pixel array of the input image into a different pixel array, and the image signal correction unit, in the remosaic processing, from among constituent pixels of the input image, detects pixel value gradients in eight directions in a conversion-target pixel location that is targeted for color conversion processing, decides an interpolated pixel value calculation mode for the conversion-target pixel on the basis of the pixel value gradients in the eight directions, and calculates an interpolated pixel value for the conversion-target pixel location in accordance with the decided processing mode.

In addition, in an embodiment of the image processing device of the present disclosure, the image signal correction unit executes remosaic processing for inputting, as the input image, an image having a quadripartite Bayer-type RGB array in which colors of a Bayer-type RGB array are implemented as an array of 2×2 pixel units, and converting the input image into a Bayer array.

In addition, in an embodiment of the image processing device of the present disclosure, the image signal correction unit executes processing for selecting pixels in a direction having a small gradient, as reference pixels on the basis of the pixel value gradients in the eight directions, and calculating an interpolated pixel value for the conversion-target pixel by means of blend processing of the pixel values of the selected reference pixels.

In addition, in an embodiment of the image processing device of the present disclosure, if the largest value of the pixel value gradients in the eight directions is equal to or less than a predetermined threshold value, the image signal correction unit executes processing for calculating, as an interpolated pixel value for the conversion-target pixel, a smoothed signal based on the pixel values of the pixels surrounding the conversion-target pixel.

In addition, in an embodiment of the image processing device of the present disclosure, the image signal correction unit, in the calculation processing for the pixel value gradients in the eight directions, when calculating a gradient in at least one direction, calculates low-frequency component gradient information in which pixels of the same color included in the input image are applied, high-frequency component gradient information in which pixels of the same color included in the input image are applied, and different-color component gradient information in which pixels of different colors included in the input image are applied, and calculates a pixel value gradient by weighted addition of the three items of gradient information.

In addition, in an embodiment of the image processing device of the present disclosure, the image signal correction unit, in the calculation processing for the pixel value gradients in the eight directions, when calculating a gradient in at least one direction, calculates a low-frequency component gradient in which pixels of the same color included in the input image are applied, a high-frequency component gradient in which pixels of the same color included in the input image are applied, and a mid-frequency component gradient in which pixels of the same color included in the input image are applied, and calculates a pixel value gradient by weighted addition of the three items of gradient information.

In addition, in an embodiment of the image processing device of the present disclosure, the image signal correction unit, in the calculation processing for the pixel value gradients in the eight directions, when calculating a gradient in at least one direction, calculates a low-frequency component gradient in which pixels of the same color included in the input image are applied, and a high-frequency component gradient in which pixels of the same color included in the input image are applied, and calculates a pixel value gradient by weighted addition of the two items of gradient information.

In addition, in an embodiment of the image processing device of the present disclosure, the image signal correction unit, in the calculation processing for the pixel value gradients in the eight directions, when calculating gradients in a vertical direction and a horizontal direction, calculates low-frequency component gradient information in which pixels of the same color included in the input image are applied, high-frequency component gradient information in which pixels of the same color included in the input image are applied, and different-color component gradient information in which pixels of different colors included in the input image are applied, and calculates a pixel value gradient by weighted addition of the three items of gradient information, when calculating gradients in a top-right 45-degree direction and a bottom-right 45-degree direction, calculates low-frequency component gradient information in which pixels of the same color included in the input image are applied, high-frequency component gradient information in which pixels of the same color included in the input image are applied, and mid-frequency component gradient information in which pixels of the same color included in the input image are applied, and calculates a pixel value gradient by weighted addition of the three items of gradient information, and when calculating gradients in a top-right 22.5-degree direction, a bottom-right 22.5-degree direction, a top-right 67.5-degree direction, and a bottom-right 67.5-degree direction, calculates low-frequency component gradient information in which pixels of the same color included in the input image are applied, and high-frequency component gradient information in which pixels of the same color included in the input image are applied, and calculates a pixel value gradient by weighted addition of the two items of gradient information.

In addition, in an embodiment of the image processing device of the present disclosure, the image signal correction unit executes interpolated pixel value calculation processing in which reference pixel locations are altered in accordance with constituent pixel locations of the pixel blocks configured of the plurality of same-color pixels.

In addition, a second aspect of the present disclosure is an image processing method which is executed in an image processing device, wherein an image signal correction unit inputs a mosaic image in which pixel blocks configured of a plurality of same-color pixels are arrayed as an input image, and executes processing for detecting, from among constituent pixels of the input image, pixel value gradients in eight directions in a conversion-target pixel location that is targeted for color conversion processing, processing for deciding an interpolated pixel value calculation mode for the conversion-target pixel on the basis of the pixel value gradients in the eight directions, and processing for calculating an interpolated pixel value for the conversion-target pixel location in accordance with the decided processing mode.

In addition, a third aspect of the present disclosure is a program which causes image processing to be executed in an image processing device, wherein an image signal correction unit is made to input a mosaic image in which pixel blocks configured of a plurality of same-color pixels are arrayed as an input image, and to execute processing for detecting, from among constituent pixels of the input image, pixel value gradients in eight directions in a conversion-target pixel location that is targeted for color conversion processing, processing for deciding an interpolated pixel value calculation mode for the conversion-target pixel on the basis of the pixel value gradients in the eight directions, and processing for calculating an interpolated pixel value for the conversion-target pixel location in accordance with the decided processing mode.

Moreover, the program of the present disclosure is, for example, a program that can be provided by means of a storage medium or a communication medium provided in a computer-readable format, with respect to an information processing device or a computer system capable of executing various program codes. By providing this kind of program in a computer-readable format, processing corresponding to the program is realized on the information processing device or the computer system.

Further objectives, features, and advantages of the present disclosure will become apparent by means of a more detailed explanation based on an embodiment of the present disclosure described hereafter and the appended drawings. It should be noted that a system in the present description is a logical set configuration of a plurality of devices, and is not restricted to the constituent devices being in the same enclosure.

Effects of the Invention

According to the configuration of an embodiment of the present disclosure, a device and a method for executing remosaic processing for performing conversion into an image of a difference pixel array are realized.

Specifically, remosaic processing for inputting, as an input image, a mosaic image in which pixel blocks configured of a plurality of same-color pixels are arrayed, and converting the pixel array of the input image into a different pixel array is executed. In this remosaic processing, from among constituent pixels of the input image, pixel value gradients in eight directions in a conversion-target pixel location that is targeted for color conversion processing are detected, an interpolated pixel value calculation mode for the conversion-target pixel is decided on the basis of the pixel value gradients in the eight directions, and an interpolated pixel value for the conversion-target pixel location is calculated in accordance with the decided processing mode. For example, an image having a quadripartite Bayer-type RGB array in which colors of a Bayer-type RGB array are implemented as an array of 2×2 pixel units is converted into a Bayer array.

BRIEF DESCRIPTION OF DRAWINGS

FIG. 1 is a drawing illustrating an exemplary configuration of an imaging element.

FIG. 6 is a drawing illustrating direction determination processing executed by the image processing device of the present disclosure.

FIG. 12 is a drawing illustrating direction determination processing executed by the image processing device of the present disclosure.

FIG. 13 is a drawing illustrating direction determination processing executed by the image processing device of the present disclosure.

FIG. 15 is a drawing illustrating G interpolation processing executed by the image processing device of the present disclosure.

FIG. 16 is a drawing illustrating G interpolation processing executed by the image processing device of the present disclosure.

FIG. 17 is a drawing illustrating G interpolation processing executed by the image processing device of the present disclosure.

FIG. 18 is a drawing illustrating G interpolation processing executed by the image processing device of the present disclosure.

FIG. 19 is a drawing illustrating RB estimation processing executed by the image processing device of the present disclosure.

MODES FOR CARRYING OUT THE INVENTION

Figure 2:
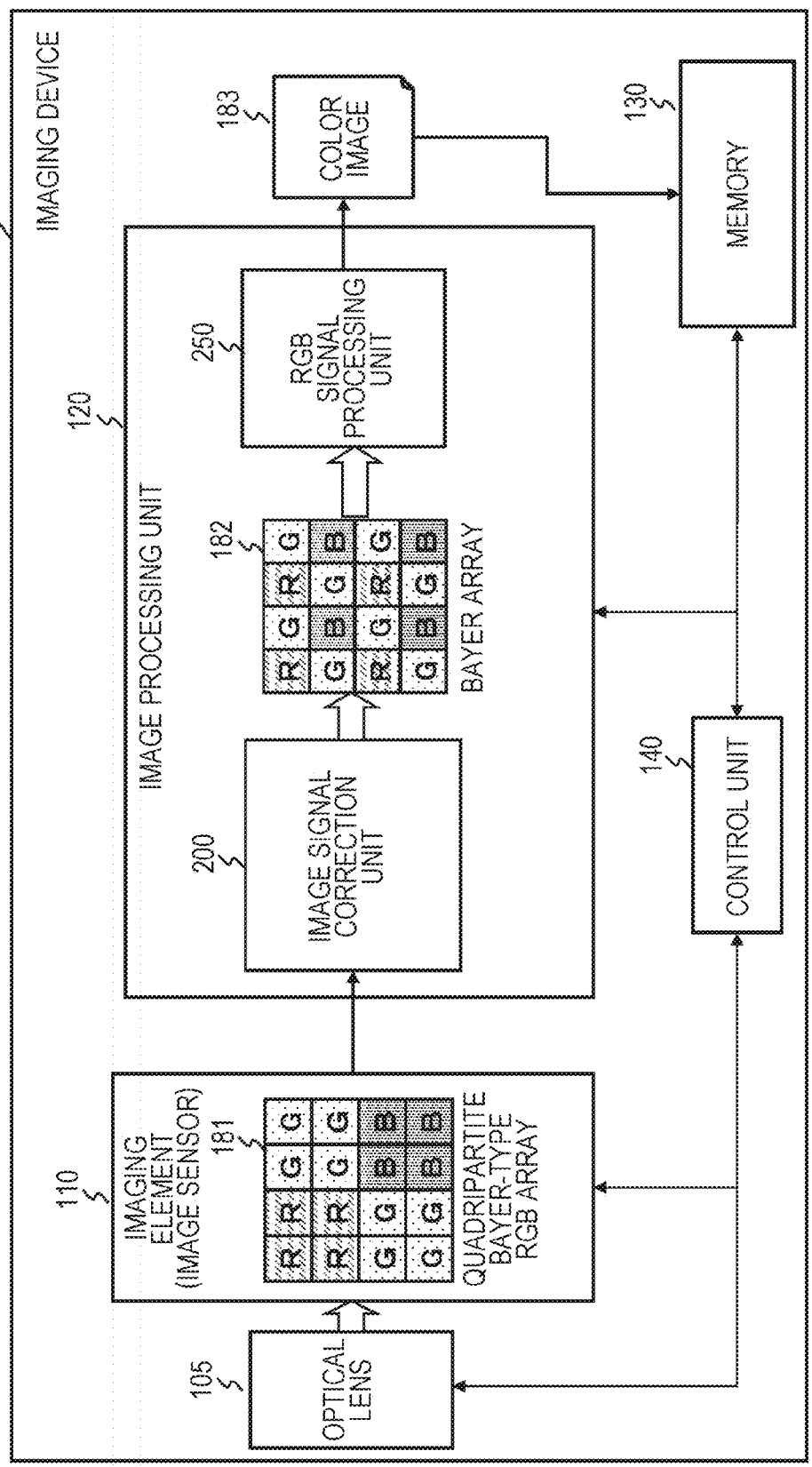
FIG. 2 is a drawing illustrating an exemplary configuration of an image processing device.

Details of the image processing device, and the image processing method, and the program of the present disclosure are described hereafter with reference to the drawings. It should be noted that the explanation is given in accordance with the following items.

1. Regarding an exemplary configuration of an imaging element
2. Regarding an exemplary configuration of an image processing device
3. Regarding a specific example of image processing
4. Regarding details of remosaic processing
5. Summary of the configuration of the present disclosure

[1. Regarding an Exemplary Configuration of an Imaging Element]

An exemplary configuration of an imaging element is described with reference to FIG. 1. FIG. 1 depicts the following three imaging element exemplary configurations.

(1) Bayer array
(2) Quadripartite Bayer-type RGB array
(3) RGBW-type array (1) Bayer array is an array that is employed in many cameras, and signal processing for captured images that has a color filter having this Bayer array is more or less established.

However, with regard to (2) quadripartite Bayer-type RGB array and (3) RGBW-type array, at present it still cannot be said that sufficient studies have been carried out with regard to signal processing for images captured by an imaging element provided with these filters.

It should be noted that the (2) quadripartite Bayer-type RGB array is equivalent to an array in which single R, G, and B pixels of the Bayer array depicted in (1) are set as four pixels.

An image processing device that executes signal processing for images captured by an imaging element provided with a color filter having this (2) quadripartite Bayer-type RGB array is described hereafter.

[2. Regarding an Exemplary Configuration of an Image Processing Device]

FIG. 2 depicts an exemplary configuration of an imaging device 100 that is an exemplary configuration of the image processing device of the present disclosure.

As depicted in FIG. 2, the imaging device 100 has an optical lens 105, an imaging element (image sensor) 110, an image processing unit 120, a memory 130, and a control unit 140.

It should be noted that the imaging device 100 depicted in FIG. 2 is an example of the image processing device of the present disclosure, and the image processing device of the present disclosure also includes a device such as a PC. An image processing device such as a PC does not have the optical lens 105 and the imaging element 110 of the imaging device 100 depicted in FIG. 2 and is configured from other constituent elements, and is a configuration that has an input unit for data acquired by the imaging device 100, or a storage unit.

Hereafter, the imaging device 100 depicted in FIG. 2 is described as a representative example of the image processing device of the present disclosure. It should be noted that the imaging device 100 depicted in FIG. 2 is a still camera or a video camera or the like.

The imaging element (image sensor) 110 of the imaging device 100 depicted in FIG. 2 is a configuration provided with a color filter made up of the quadripartite Bayer-type RGB array described with reference to FIG. 1(2), and is an imaging element provided with a filter having the three types of spectral characteristics of:

red (R) that transmits near-red wavelengths,
green (G) that transmits near-green wavelengths, and
blue (B) that transmits near-blue wavelengths.

As previously described, a quadripartite Bayer-type RGB array is equivalent to an array in which single pixels of the Bayer array depicted in FIG. 1(1) are set as four pixels.

The imaging element 110 having this quadripartite Bayer-type RGB array 181 receives, in pixel units, light of any of RGB via the optical lens 105, and by means of photoelectric conversion, generates and outputs an electrical signal corresponding to light-reception signal intensity. A mosaic image formed from the three types of spectra of RGB is obtained by this imaging element 110.

The output signal of the imaging element (image sensor) 110 is input to an image signal correction unit 200 of the image processing unit 120.

The image signal correction unit 200 executes processing for converting an image having the quadripartite Bayer-type RGB array 181 into a Bayer array 182 that is often used in general cameras.

In other words, processing for converting a captured image having the quadripartite Bayer-type RGB array depicted in FIG. 1(2) into the Bayer array depicted in FIG. 1(1) is performed.

Hereafter, this kind of color array conversion processing is referred to as remosaic processing.

An image having the Bayer array 182 depicted in FIG. 2 is generated as the result of remosaic processing in the image signal correction unit 200, and this image is input to an RGB signal processing unit 250. The RGB signal processing unit 250 executes processing that is the same as that of a signal processing unit in a camera provided with a known Bayer-array color filter, for example WB (white balance) adjustment and demosaic processing for setting RGB pixel values to pixels and so forth, and generates and outputs a color image 183. The color image 183 is stored in the memory 130.

Moreover, control signals from the control unit 140 are input to the optical lens 105, the imaging element 110, and the image processing unit 120, and photographing processing control and signal processing control are executed. In accordance with a program stored in the memory 130 for example, the control unit 140 for example executes various kinds of processing other than imaging in accordance with user input from an input unit that is not depicted.

[3. Regarding a Specific Example of Image Processing]

Figure 3:
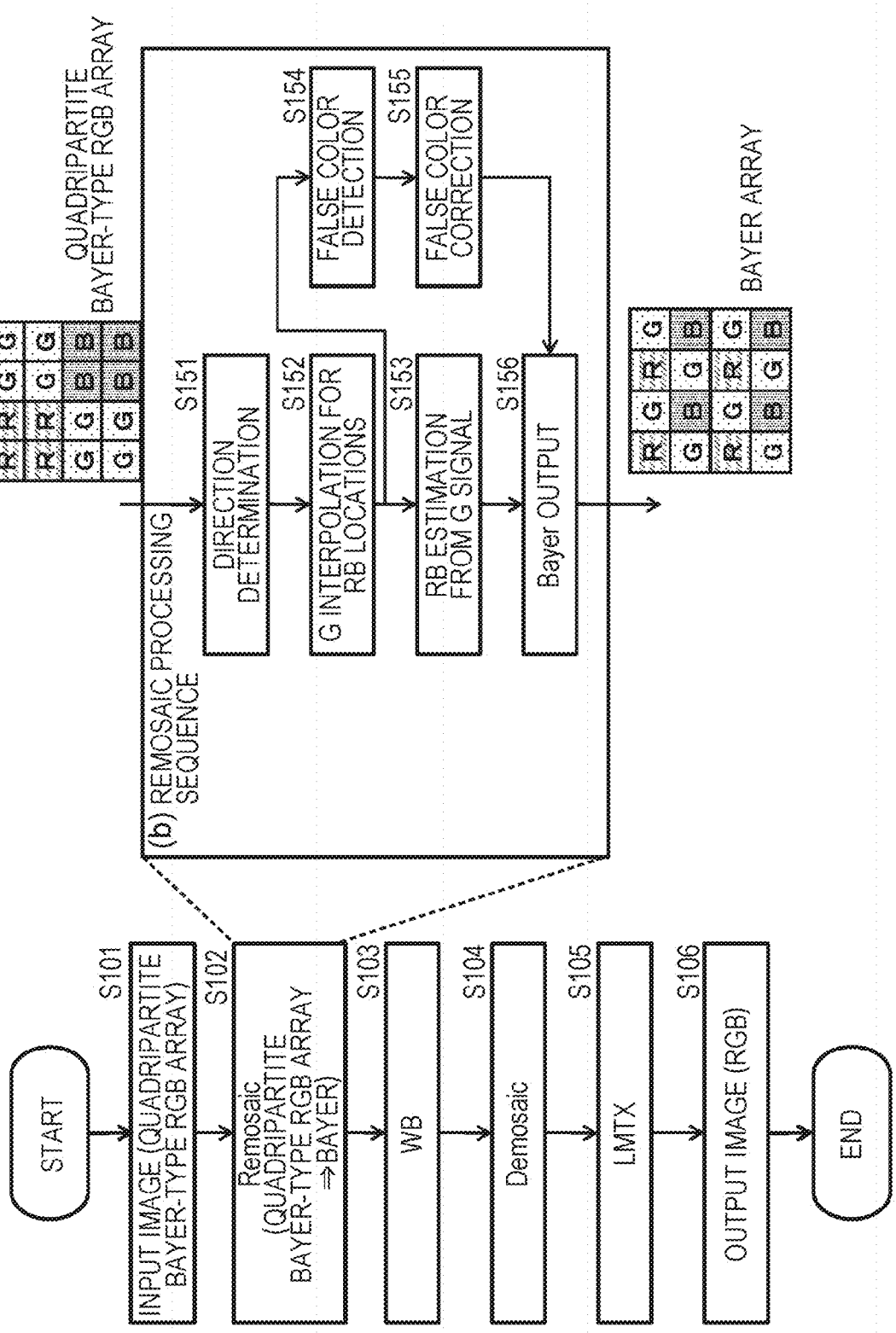
FIG. 3 is a drawing depicting a flowchart illustrating processing executed by the image processing device of the present disclosure.

Next, processing that is executed in the image processing unit 120 of FIG. 2 is described with reference to FIG. 3 and thereafter.

FIG. 3(a) is the entire signal processing sequence depicting the entirety of the processing executed in the image processing unit 120.

First, in step S101, a captured image is input from the imaging element 110.

This captured image is an image having the quadripartite Bayer-type RGB array 181.

Next, in step S102, remosaic processing is executed. This is processing that is executed by the image signal correction unit 200 depicted in FIG. 2, and is processing for converting the captured image having the quadripartite Bayer-type RGB array 181 into the Bayer array 182.

The details of this processing are depicted in the flow depicted in FIG. 3(b). This processing is described hereafter.

When the remosaic processing has been completed in step S102, an image having the Bayer array 182 depicted in FIG. 2 is generated as the result of the remosaic processing.

Step S103 and thereafter is processing performed by the RGB signal processing unit 250 depicted in FIG. 2, and is signal processing that is executed in a general camera.

In step S103, white balance (WB) adjustment processing is executed.

In step S104, demosaic processing for setting RGB pixel values to the pixels is executed.

In step S105, linear matrix (LMTX) processing for removing mixed colors and so forth is executed.

Finally, in step S106, the color image 183 depicted in FIG. 2 is generated and output as an output image.

The remosaic processing of step S102 is executed in accordance with the flow depicted in FIG. 3(b). This is processing for converting a quadripartite Bayer-type RGB array image into a Bayer array image.

It should be noted that the details of the remosaic processing are furthermore described in detail with reference to FIG. 4 and thereafter.

First, a summary of the remosaic processing is described with reference to the flow depicted in FIG. 3(b).

First, in step S151, direction determination for the pixel value gradients of the quadripartite Bayer-type RGB array image which is the input image is performed. This is processing that is equivalent to what is known as edge direction determination.

Next, in step S152, G interpolation processing for estimating and setting G pixel values for RB locations in the quadripartite Bayer-type RGB array image is performed. At the time of this interpolation processing, interpolation processing is performed in which the pixel value gradient information calculated in step SZ151 is applied, and a pixel value in a direction having a small pixel value gradient serves as a reference pixel value.

In addition, in step S153, estimation of RB pixel values in a G signal location is performed. This estimation processing is performed on the basis of the estimation that G pixel values and the RB pixel values have a fixed correlation in a predetermined local region.

By means of the processing of these steps S152 and S153, basic pixel value setting for converting the captured image having the quadripartite Bayer-type RGB array 181 into the Bayer array 182 is performed.

In addition, parallel with this processing, false color detection in step S154 and false color correction in step S155 are executed.

If a signal in which the Nyquist frequency (frequency of ½ of the sampling frequency) of the imaging element (image sensor) 110 is exceeded is included in the signals input to the imaging element (image sensor) 110, aliasing (folding) based on the sampling theorem occurs, which is a factor in the occurrence of image quality deterioration, specifically false colors.

In steps S154 to S155, this kind of false color detection and false color correction are executed.

In step S156, a Bayer array image in which the results of the false color detection and the false color correction in steps S154 to S155 are reflected is generated and output.

[4. Regarding Details of Remosaic Processing]

Next, details of the remosaic processing are described with reference to the flowchart depicted in FIG. 4 and the processing examples of FIG. 5 and thereafter.

Figure 4:
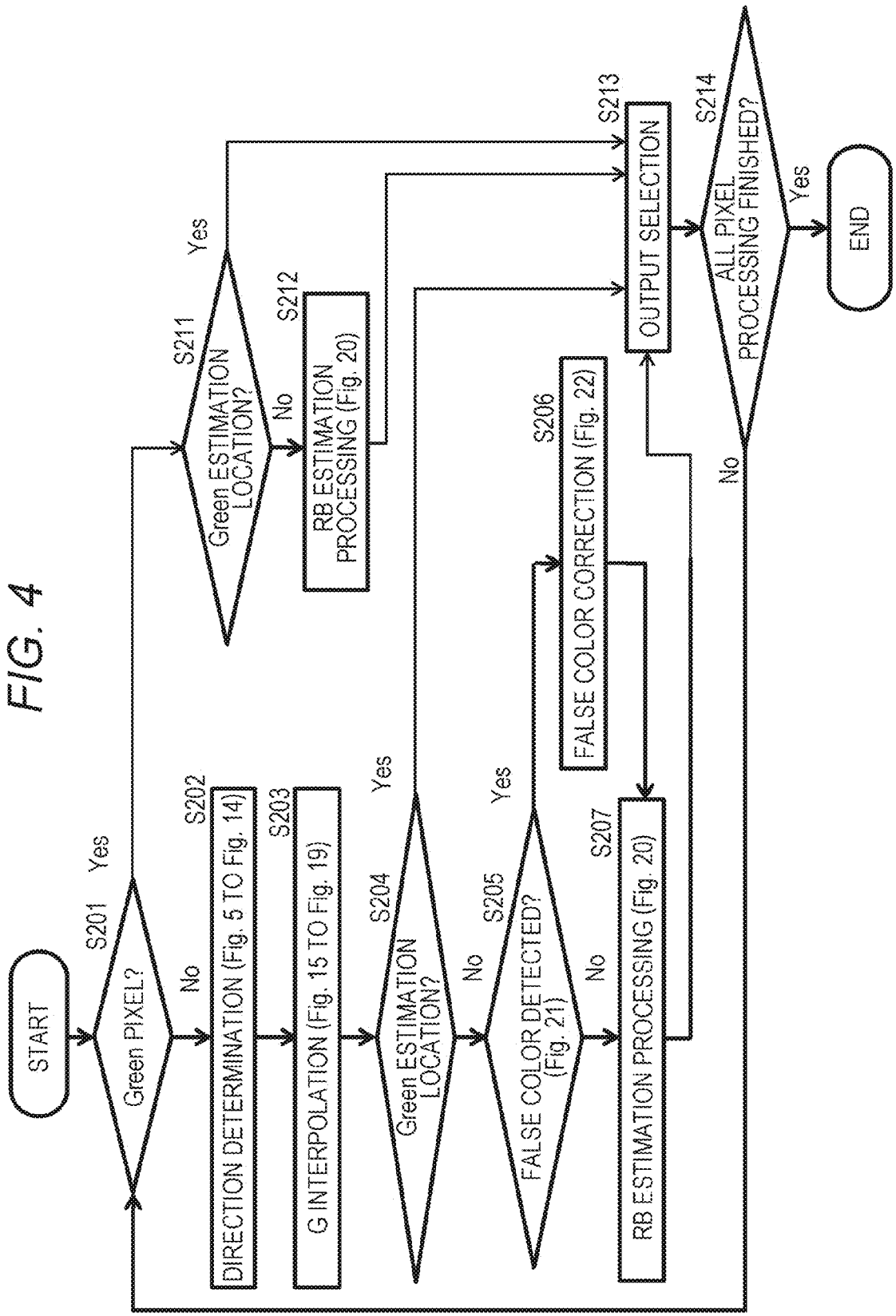
FIG. 4 is a drawing depicting a flowchart illustrating processing executed by the image processing device of the present disclosure.

The flowchart depicted in FIG. 4 is a flowchart that corresponds to the processing of step S102 of the entire processing flow of FIG. 3(a), and depicts the flow of FIG. 3(b) in further detail.

The flow depicted in FIG. 4 is described. The flow depicted in FIG. 4 is a flow that illustrates the sequence of the remosaic processing executed in the image signal correction unit 200 depicted in FIG. 2.

The image signal correction unit 200 depicted in FIG. 2 sequentially inputs, from the imaging element 110, pixel values of the quadripartite Bayer-type RGB array image, and executes processing according to the flow depicted in FIG. 4.

First, in step S201, it is determined whether or not an input pixel value is a G pixel.

If the input pixel value is not a G pixel, in other words if the input pixel value is an RB pixel, processing advances to step S202, and direction determination is performed.

This direction determination is processing for determining the gradient (grad) of a pixel value, and is executed as processing that is the same as edge direction determination.

The direction determination processing of step S202 is described with reference to FIG. 5 and thereafter.

Figure 5:
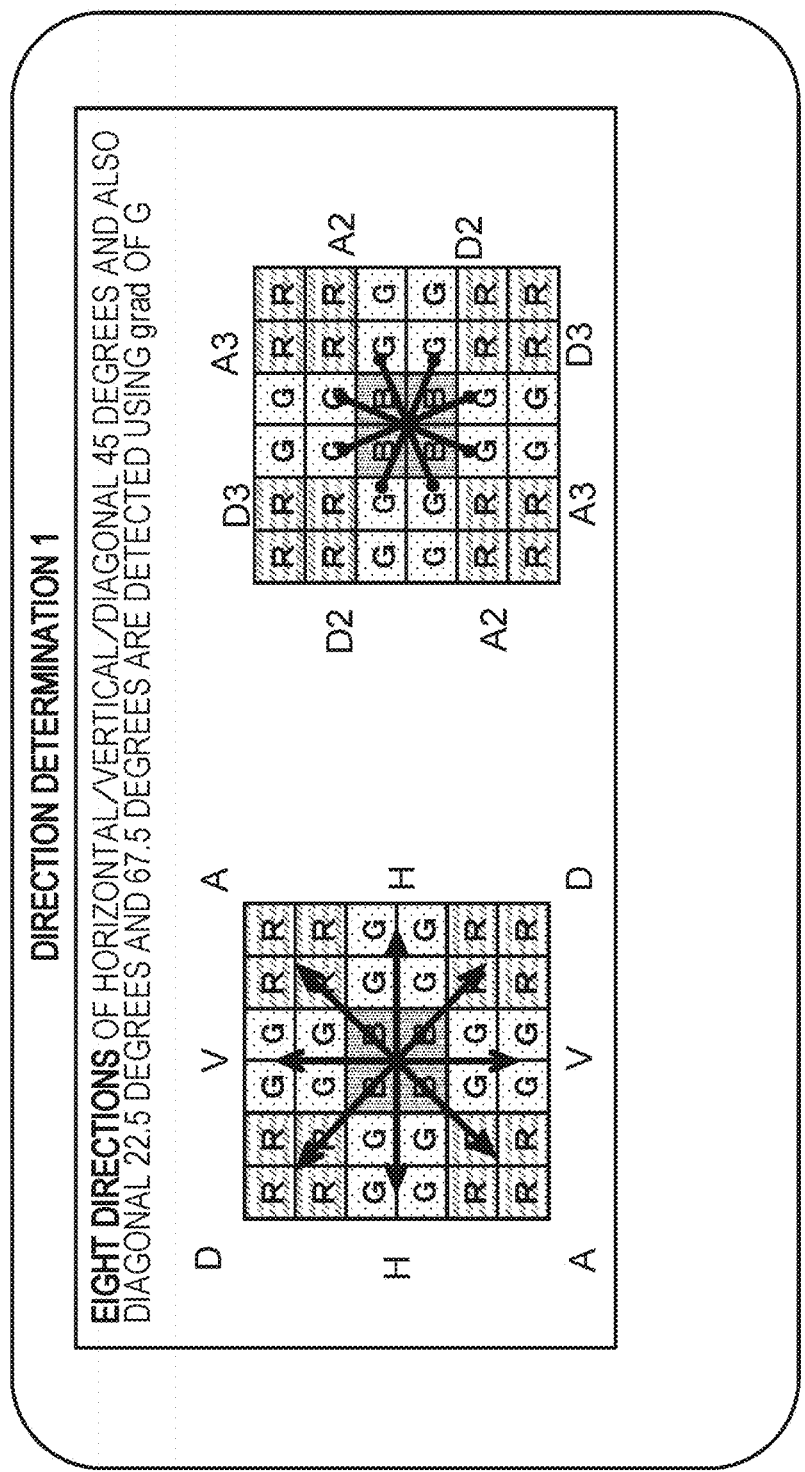
FIG. 5 is a drawing illustrating direction determination processing executed by the image processing device of the present disclosure.

As depicted in FIG. 5, the gradient (grad) of a pixel value is calculated with respect to a total of eight directions of the four directions of
   the horizontal direction (H),
   the vertical direction (V),
   the top-right 45-degree direction (A), and
   the bottom-right 45-degree direction (D),
and, in addition, also the four directions of
   the top-right 22.5-degree direction (A2),
   the top-right 67.5-degree direction (A3),
   the bottom-right 22.5-degree direction (D2), and
   the bottom-right 67.5-degree direction (D3).

With regard to the quadripartite Bayer-type RGB array previously described with reference to FIG. 1(2), the sampling intervals for same-color components are sparse compared to the Bayer array depicted in FIG. 1(1), and therefore folding occurs at the ½ Nyquist frequency.

In order to accurately detect this kind of frequency folding pattern, in the direction determination of the present disclosure, as described above, determination is executed in the large number of eight directions.

Moreover, in the present embodiment, when gradient detection in this large number of directions is performed, for example, in addition to the gradient information calculated by selecting only same-color pixels from gradient directions, as depicted in FIG. 6, processing is performed in which the horizontal/vertical gradients obtained by comparing pixel values between different colors are detected, and consideration is also given to this horizontal/vertical gradient information obtained by comparing the pixel values between different colors. It should be noted that, when this kind of gradient detection by means of different-color pixel values is executed, it is preferable for this to be executed after the white balance (WB) of the pixels applied in the gradient detection has been adjusted. The details of the gradient detection processing in each direction is described with reference to FIG. 7 and thereafter.

(Horizontal Direction (H) Gradient: gradH)

Figure 7:
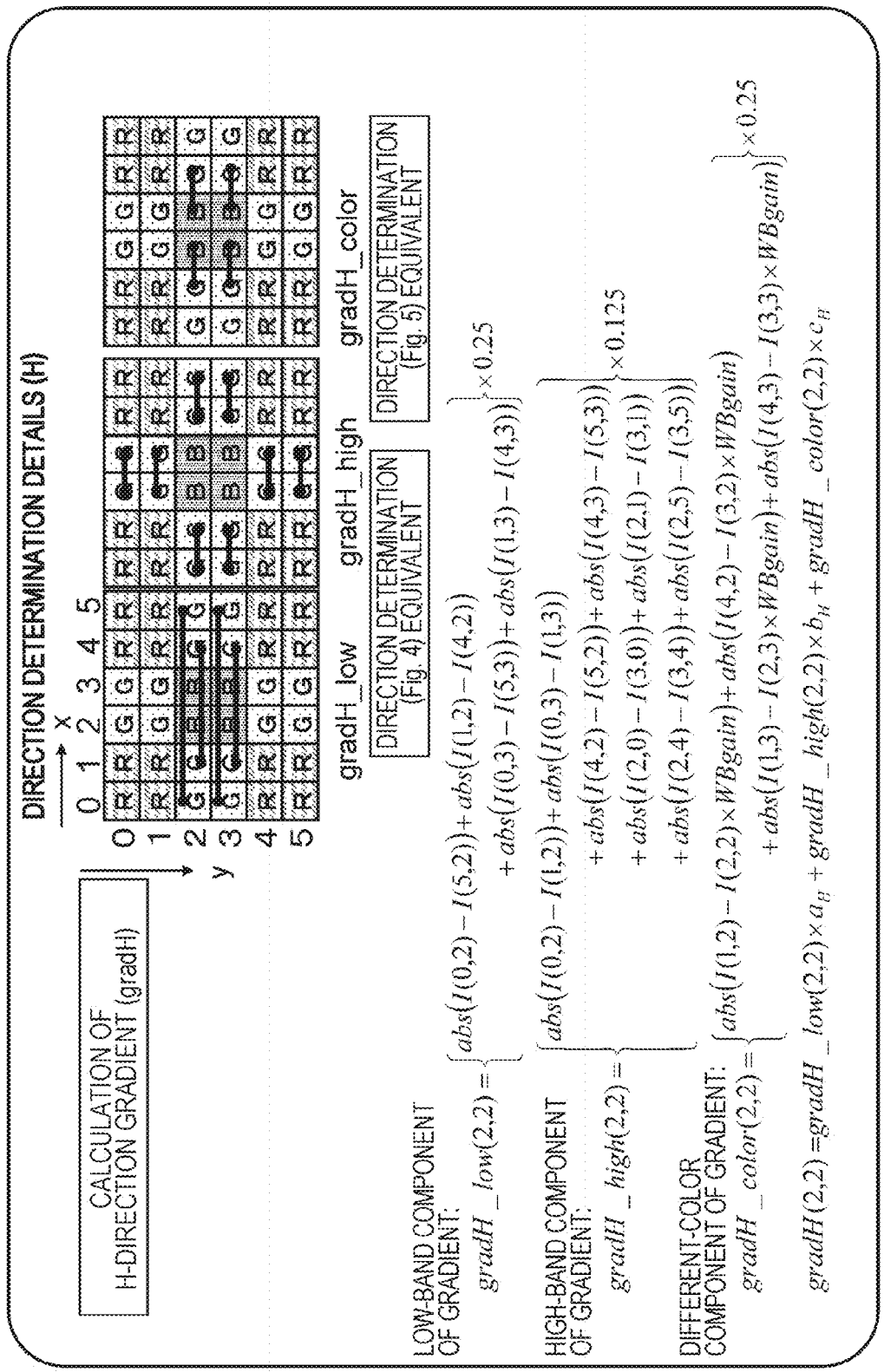
FIG. 7 is a drawing illustrating direction determination processing executed by the image processing device of the present disclosure.

The example depicted in FIG. 7 depicts a horizontal direction (H) gradient calculation processing example corresponding to the coordinate location (2, 2) in the 6×6 pixels depicted in FIG. 7.

The horizontal direction (H) gradient is calculated on the basis of the following data.
Low-frequency component horizontal direction (H) gradient: gradH_low
High-frequency component horizontal direction (H) gradient: gradH_high
Different-color component horizontal direction (H) gradient: gradH_color It should be noted that I(x,y) is the pixel value at the location of coordinate (x,y).

abs( ) represents an absolute value.

The horizontal direction (H) gradient corresponding to the coordinate location (2, 2) in the 6×6 pixels depicted in FIG. 7, in other words gradH(2, 2), is calculated in accordance with the following formula.

[Mathematical Formula 1]

$$\text{gradH\_low}(2,2) = \left\{ \begin{array}{l} \text{abs}(I(0,2) - I(5,2)) + \text{abs}(I(1,2) - I(4,2)) + \\ \text{abs}(I(0,3) - I(5,3)) + \text{abs}(I(1,3) - I(4,3)) \end{array} \right\} \times 0.25$$

$$\text{gradH\_high}(2,2) = \left\{ \begin{array}{l} \text{abs}(I(0,2) - I(1,2)) + \text{abs}(I(0,3) - I(1,3)) + \\ \text{abs}(I(4,2) - I(5,2)) + \text{abs}(I(4,3) - I(5,3)) + \\ \text{abs}(I(2,0) - I(3,0)) + \text{abs}(I(2,1) - I(3,1)) + \\ \text{abs}(I(2,4) - I(3,4)) + \text{abs}(I(2,5) - I(3,5)) \end{array} \right\} \times 0.125$$

$$\text{gradH\_color}(2,2) = \left\{ \begin{array}{l} \text{abs}(I(1,2) - I(2,2) \times WBgain) + \\ \text{abs}(I(4,2) - I(3,2) \times WBgain) + \\ \text{abs}(I(1,3) - I(2,3) \times WBgain) + \\ \text{abs}(I(4,3) - I(3,3) \times WBgain) \end{array} \right\} \times 0.25$$

$$gradH(2,2) = $$
$$\text{gradH\_low}(2,2) \times a_H + \text{gradH\_high}(2,2) \times b_H + \text{gradH\_color}(2,2) \times c_H$$

It should be noted that, in the above formula, $a_H$, $b_H$, and $c_H$ are predefined weighting coefficients.

Generally, when incident light passes through a lens, the signal level decreases at high-frequency components. Therefore, it is desirable for the magnitude relationship of the abovementioned weighting coefficients to be $a_H > b_H$.

Furthermore, an intense false color is generated if the direction determination is erroneous in the ½ Nq vicinity.

In order to sufficiently suppress erroneous determination in this region, it is desirable to set $c_H > a_H$.

(Vertical Direction (V) Gradient: gradV)

Figure 8:
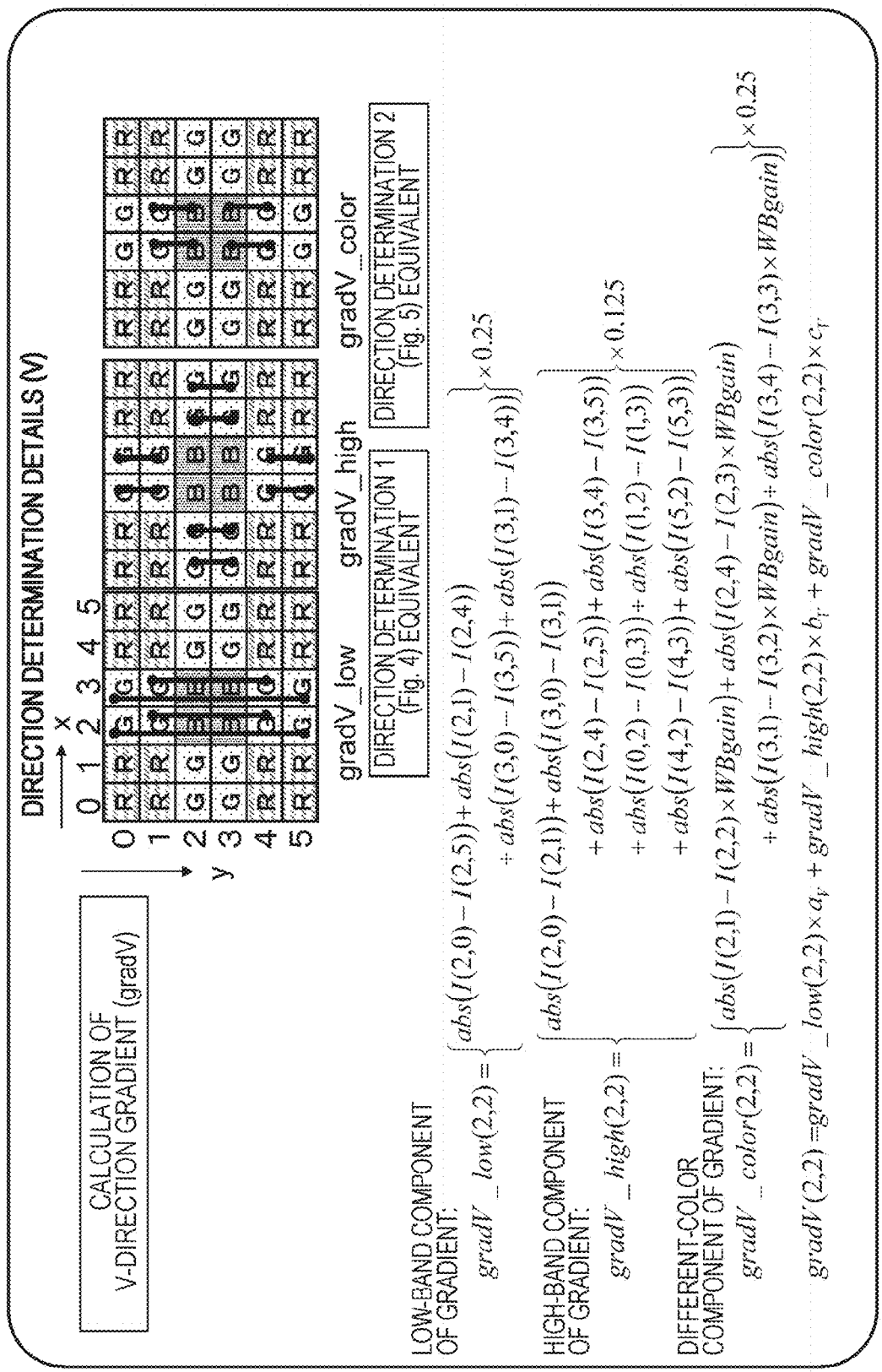
FIG. 8 is a drawing illustrating direction determination processing executed by the image processing device of the present disclosure.

The example depicted in FIG. 8 depicts a vertical direction (V) gradient calculation processing example corresponding to the coordinate location (2, 2) in the 6×6 pixels depicted in FIG. 8.

The vertical direction (V) gradient is calculated on the basis of the following data.

Low-frequency component vertical direction (V) gradient: gradV_low

High-frequency component vertical direction (V) gradient: gradV_high

Different-color component vertical direction (V) gradient: gradV_color

It should be noted that I(x,y) is the pixel value at the location of coordinate (x,y).

abs( ) represents an absolute value.

The vertical direction (V) gradient corresponding to the coordinate location (2, 2) in the 6×6 pixels depicted in FIG. 8, in other words gradV(2, 2), is calculated in accordance with the following formula.

[Mathematical Formula 2]

$$\text{gradV\_low}(2,2) = \left\{ \begin{array}{l} \text{abs}(I(2,0) - I(2,5)) + \text{abs}(I(2,1) - I(2,4)) + \\ \text{abs}(I(3,0) - I(3,5)) + \text{abs}(I(3,1) - I(3,4)) \end{array} \right\} \times 0.25$$

$$\text{gradV\_high}(2,2) = \left\{ \begin{array}{l} \text{abs}(I(2,0) - I(2,1)) + \text{abs}(I(3,0) - I(3,1)) + \\ \text{abs}(I(2,4) - I(2,5)) + \text{abs}(I(3,4) - I(3,5)) + \\ \text{abs}(I(0,2) - I(0,3)) + \text{abs}(I(1,2) - I(1,3)) + \\ \text{abs}(I(4,2) - I(4,3)) + \text{abs}(I(5,2) - I(5,3)) \end{array} \right\} \times 0.125$$

$$\text{gradV\_color}(2,2) = \left\{ \begin{array}{l} \text{abs}(I(2,1) - I(2,2) \times WBgain) + \\ \text{abs}(I(2,4) - I(2,3) \times WBgain) + \\ \text{abs}(I(3,1) - I(3,2) \times WBgain) + \\ \text{abs}(I(3,4) - I(3,3) \times WBgain) \end{array} \right\} \times 0.25$$

$$gradV(2,2) =$$
$$\text{gradH\_low}(2,2) \times a_V + \text{gradV\_high}(2,2) \times b_V + \text{gradV\_color}(2,2) \times c_V$$

It should be noted that, in the above formula, $a_V$, $b_V$, and $c_V$ are predefined weighting coefficients.

As previously described, generally, when incident light passes through a lens, the signal level decreases at high-frequency components.

Therefore, it is desirable for the magnitude relationship of the weighting coefficients to be $a_V > b_V$.

Furthermore, an intense false color is generated if the direction determination is erroneous in the ½ Nq vicinity.

In order to sufficiently suppress erroneous determination in this region, it is desirable to set $c_V > a_V$.

(Top-Right 45-Degree Direction (A) Gradient: gradA)

Figure 9:
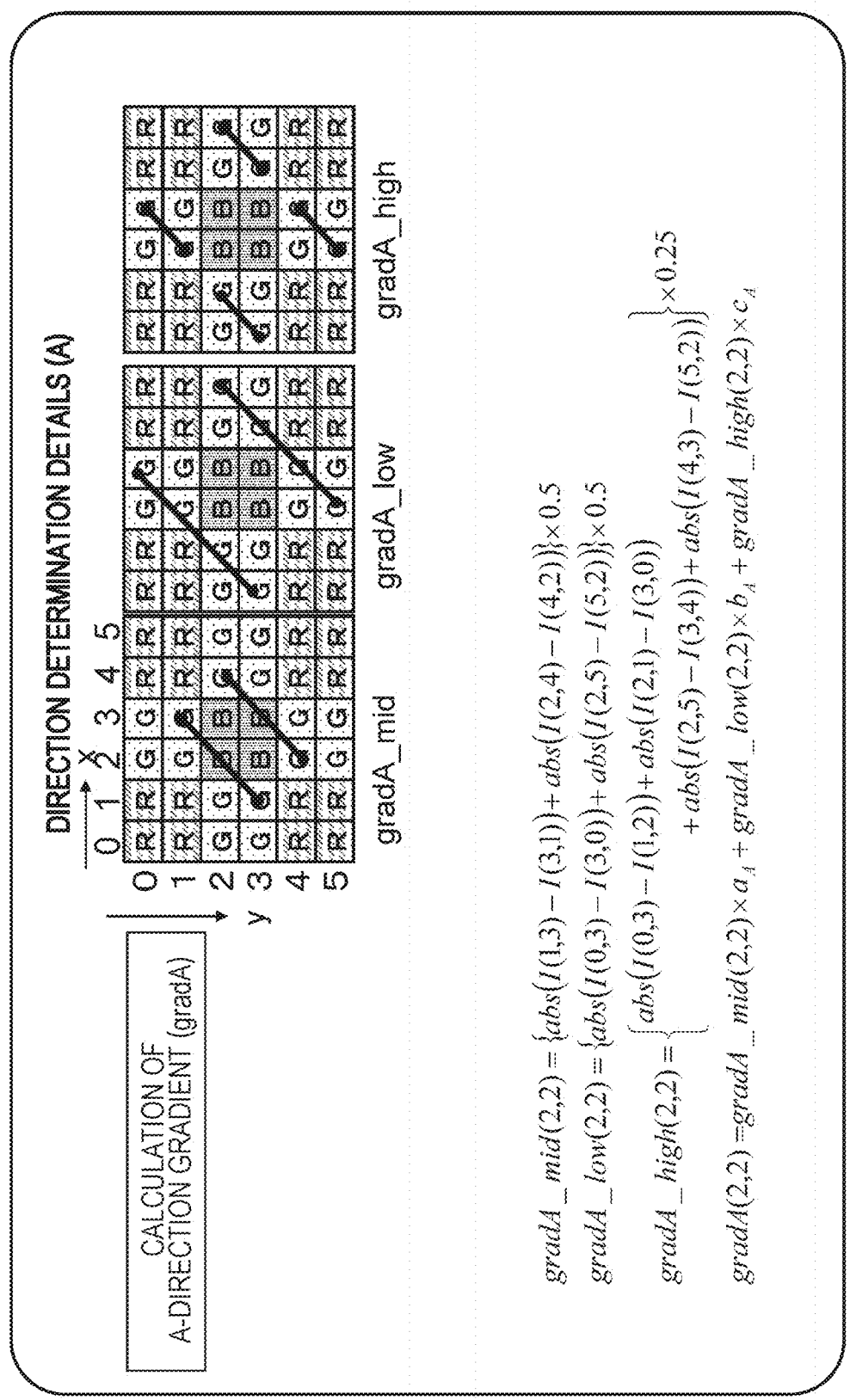
FIG. 9 is a drawing illustrating direction determination processing executed by the image processing device of the present disclosure.

The example depicted in FIG. 9 depicts a top-right 45-degree direction (A) gradient calculation processing example corresponding to the coordinate location (2, 2) in the 6×6 pixels depicted in FIG. 9.

The top-right 45-degree direction (A) gradient is calculated on the basis of the following data.

Mid-frequency component top-right 45-degree direction (A) gradient: gradA_mid

Low-frequency component top-right 45-degree direction (A) gradient: gradA_low

High-frequency component top-right 45-degree direction (A) gradient: gradA_high

It should be noted that I(x,y) is the pixel value at the location of coordinate (x,y).

abs( ) represents an absolute value.

The top-right 45-degree direction (A) gradient corresponding to the coordinate location (2, 2) in the 6×6 pixels depicted in FIG. 9, in other words gradA(2, 2), is calculated in accordance with the following formula.

[Mathematical Formula 3]

$$\text{gradA\_mid}(2,2) = \{\text{abs}(I(1,3) - I(3,1)) + \text{abs}(I(2,4) - I(4,2))\} \times 0.5$$

$$\text{gradA\_low}(2,2) = \{\text{abs}(I(0,3) - I(3,0)) + \text{abs}(I(2,5) - I(5,2))\} \times 0.5$$

$$\text{gradA\_high}(2,2) = \left\{ \begin{array}{l} \text{abs}(I(0,3) - I(1,2)) + \\ \text{abs}(I(2,1) - I(3,0)) + \\ \text{abs}(I(2,5) - I(3,4)) + \\ \text{abs}(I(4,3) - I(5,2)) \end{array} \right\} \times 0.25$$

$$gradA(2,2) = \text{gradA\_mid}(2,2) \times a_A +$$
$$\text{gradA\_low}(2,2) \times b_A +$$
$$\text{gradA\_high}(2,2) \times c_A$$

It should be noted that, in the above formula, $a_A$, $b_A$, and $c_A$ are predefined weighting coefficients.

As previously described, generally, when incident light passes through a lens, the signal level decreases at high-frequency components.

Therefore, it is desirable for the magnitude relationship of the weighting coefficients in the above formula to be $a_A$, $b_A > c_A$.

(Bottom-Right 45-Degree Direction (D) Gradient: gradD)

Figure 10:
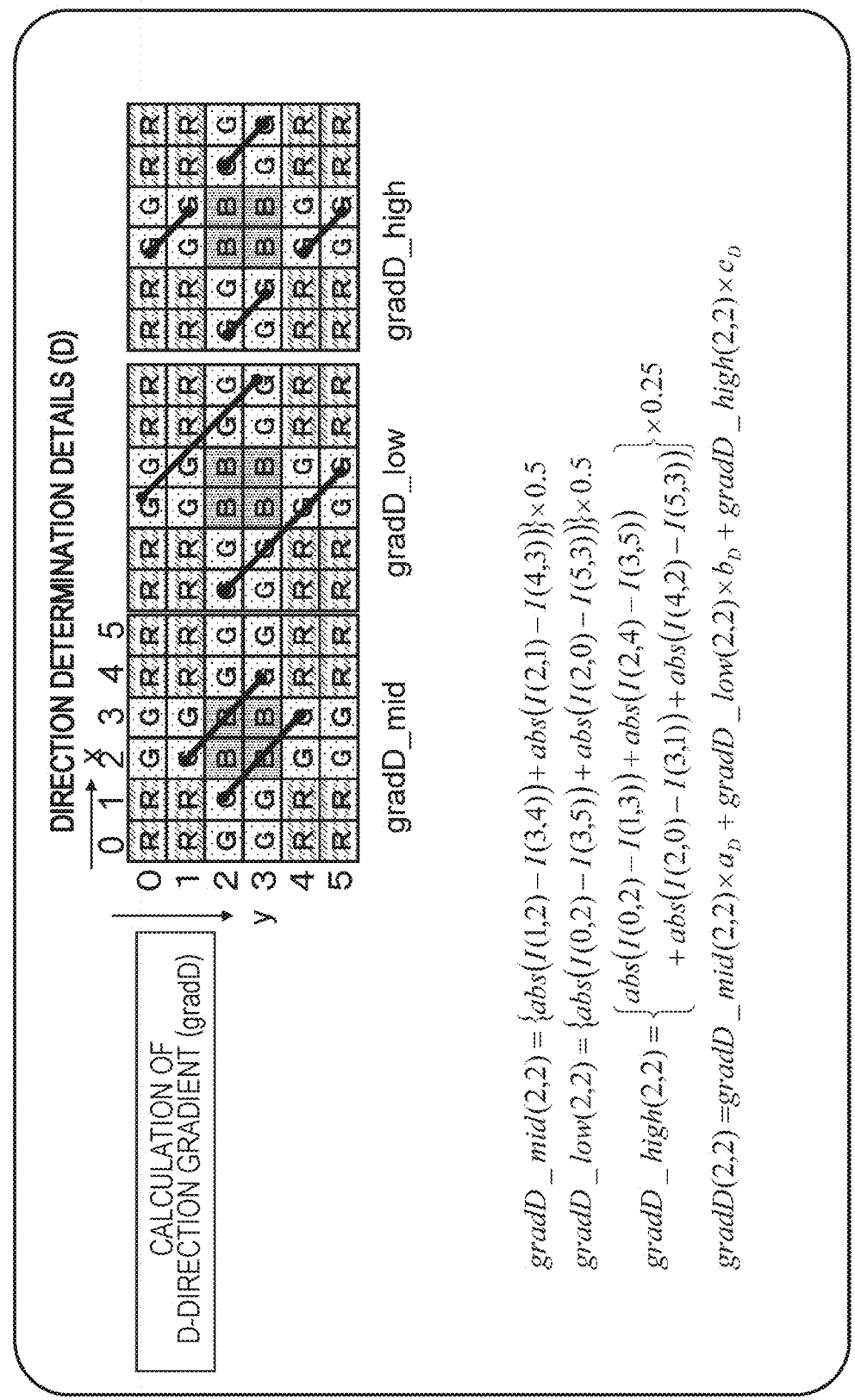
FIG. 10 is a drawing illustrating direction determination processing executed by the image processing device of the present disclosure.

The example depicted in FIG. 10 depicts a bottom-right 45-degree direction (D) gradient calculation processing example corresponding to the coordinate location (2, 2) in the 6×6 pixels depicted in FIG. 10.

The bottom-right 45-degree direction (D) gradient is calculated on the basis of the following data.

Mid-frequency component bottom-right 45-degree direction (D) gradient: gradD_mid Low-frequency component bottom-right 45-degree direction (D) gradient: gradD_low High-frequency component bottom-right 45-degree direction (D) gradient: gradD_high It should be noted that I(x,y) is the pixel value at the location of coordinate (x,y).

abs( ) represents an absolute value.

The bottom-right 45-degree direction (D) gradient corresponding to the coordinate location (2, 2) in the 6×6 pixels depicted in FIG. 10, in other words gradD(2, 2), is calculated in accordance with the following formula.

[Mathematical Formula 4]

$$\text{gradD\_mid}(2,2) =$$
$$\{\text{abs}(I(1,2) - I(3,4)) + \text{abs}(I(2,1) - I(4,3))\} \times 0.5$$

$$\text{gradD\_low}(2,2) =$$
$$\{\text{abs}(I(0,2) - I(3,5)) + \text{abs}(I(2,0) - I(5,3))\} \times 0.5$$

$$gradD\_high(2,2) = \begin{Bmatrix} abs(I(0,2) - I(1,3)) + \\ abs(I(2,4) - I(3,5)) + \\ abs(I(2,0) - I(3,1)) + \\ abs(I(4,2) - I(5,3)) \end{Bmatrix} \times 0.25$$

$$gradD(2,2) = gradD\_md(2,2) \times a_D +$$
$$gradD\_low(2,2) \times b_D +$$
$$gradD\_high(2,2) \times c_D$$

It should be noted that, in the above formula, $a_D$, $b_D$, and $c_D$ are predefined weighting coefficients.

As previously described, generally, when incident light passes through a lens, the signal level decreases at high-frequency components.

Therefore, it is desirable for the magnitude relationship of the weighting coefficients in the above formula to be $a_D$, $b_D > c_D$.

(Top-Right 22.5-Degree Direction (A2) Gradient: gradA2)

Figure 11:
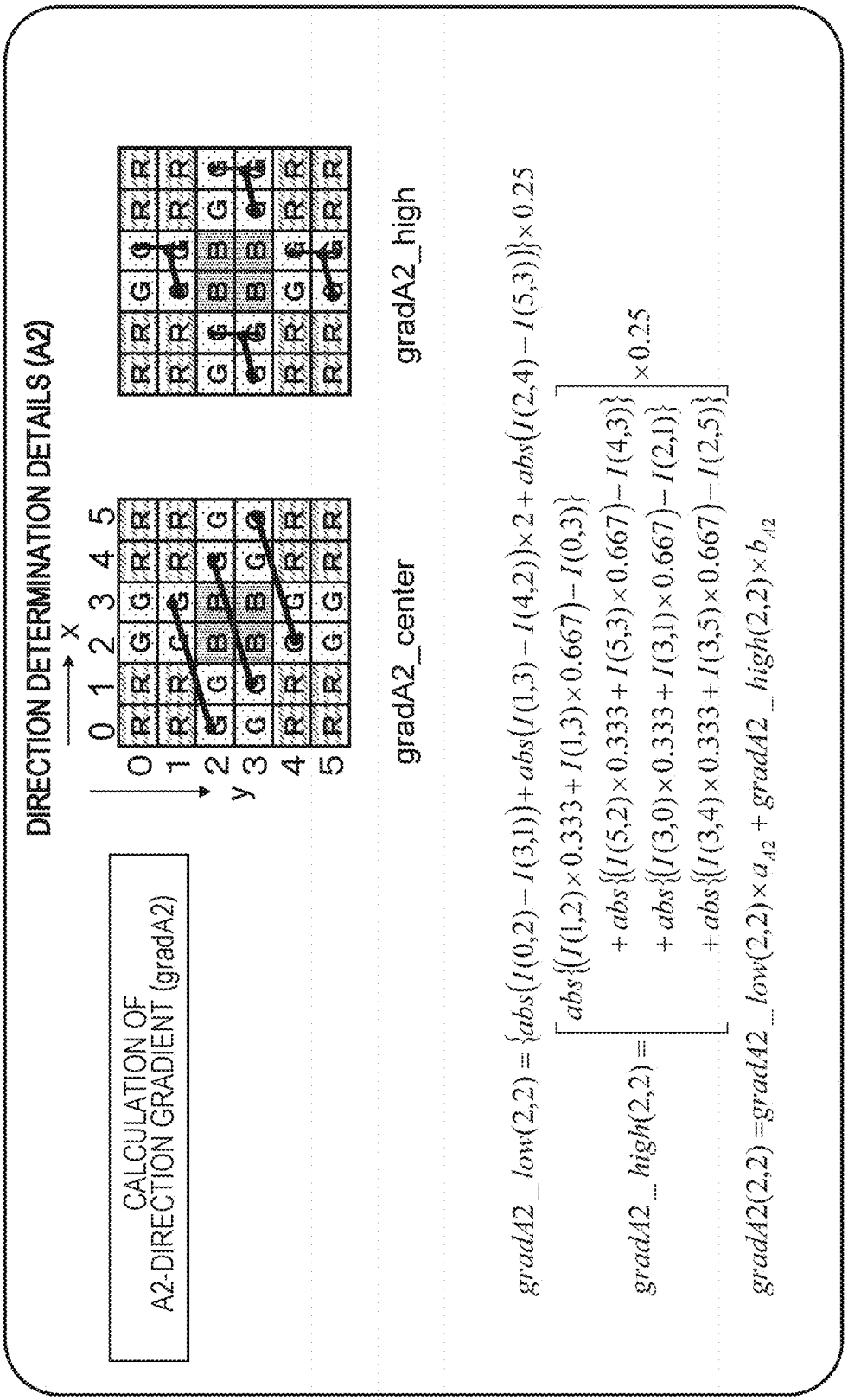
FIG. 11 is a drawing illustrating direction determination processing executed by the image processing device of the present disclosure.

The example depicted in FIG. 11 depicts a top-right 22.5-degree direction (A2) gradient calculation processing example corresponding to the coordinate location (2, 2) in the 6×6 pixels depicted in FIG. 11.

The top-right 22.5-degree direction (A2) gradient is calculated on the basis of the following data.
Center component top-right 22.5-degree direction (A2) gradient: gradA2_center
High-frequency component top-right 22.5-degree direction (A2) gradient: gradA2_high It should be noted that, as depicted in FIG. 11, because it is not possible for the high-frequency component top-right 22.5-degree direction (A2) gradient, gradA2_high, to be directly calculated from the pixel values of an output image from the imaging element, the pixel value of a virtual pixel location in a predetermined calculation direction is calculated as an interpolated pixel value for a plurality of output pixel values, and this interpolated pixel value is applied to calculate the high-frequency component top-right 22.5-degree direction (A2) gradient, gradA2_high.

It should be noted that I(x,y) is the pixel value at the location of coordinate (x,y).

abs( ) represents an absolute value.

The top-right 22.5-degree direction (A2) gradient corresponding to the coordinate location (2, 2) in the 6×6 pixels depicted in FIG. 11, in other words gradA2(2, 2), is calculated in accordance with the following formula.

[Mathematical Formula 5]

$$gradA2\_low(2,2) = \{abs(I(0,2) - I(3,1)) +$$
$$abs(I(1,3) - I(4,2)) \times 2 + abs(I(2,4) - I(5,3))\} \times 0.25$$

$$gradA2\_high(2,2) = \begin{bmatrix} abs\{(I(1,2) \times 0.333 + I(1,3) \times 0.667) - I(0,2)\} + \\ abs\{(I(5,2) \times 0.333 + I(5,3) \times 0.667) - I(4,3)\} + \\ abs\{(I(3,0) \times 0.333 + I(3,1) \times 0.667) - I(2,1)\} + \\ abs\{(I(3,4) \times 0.333 + I(3,5) \times 0.667) - I(2,5)\} \end{bmatrix} \times 0.25$$

$$gradA2(2,2) = gradA2\_low(2,2) \times a_{A2} + gradA2\_high(2,2) \times b_{A2}$$

It should be noted that, in the above formula, $a_{A2}$ and $b_{A2}$ are predefined weighting coefficients.

As previously described, generally, when incident light passes through a lens, the signal level decreases at high-frequency components.

Therefore, it is desirable for the magnitude relationship of the weighting coefficients in the above formula to be $a_{A2} > b_{A2}$.

(Bottom-Right 22.5-Degree Direction (D2) Gradient: gradD2)

The example depicted in FIG. 12 depicts a bottom-right 22.5-degree direction (D2) gradient calculation processing example corresponding to the coordinate location (2, 2) in the 6×6 pixels depicted in FIG. 12.

The bottom-right 22.5-degree direction (D2) gradient is calculated on the basis of the following data.
Center component bottom-right 22.5-degree direction (D2) gradient: gradD2_center
Both-side component bottom-right 22.5-degree direction (D2) gradient: gradD2_wb
High-frequency component bottom-right 22.5-degree direction (D2) gradient: gradD2_high It should be noted that, as depicted in FIG. 12, because it is not possible for the high-frequency component bottom-right 22.5-degree direction (D2) gradient, gradD2_high, to be directly calculated from the pixel values of an output image from the imaging element, the pixel value of a virtual pixel location in a predetermined calculation direction is calculated as an interpolated pixel value for a plurality of output pixel values, and this interpolated pixel value is applied to calculate the high-frequency component bottom-right 22.5-degree direction (D2) gradient, gradD2_high.

It should be noted that I(x,y) is the pixel value at the location of coordinate (x,y).

abs( ) represents an absolute value.

The bottom-right 22.5-degree direction (D) gradient corresponding to the coordinate location (2, 2) in the 6×6 pixels depicted in FIG. 12, in other words gradD(2, 2), is calculated in accordance with the following formula.

[Mathematical Formula 6]

$$gradD2\_low(2,2) = \{abs(I(2,1) - I(5,2)) +$$
$$abs(I(1,2) - I(4,3)) \times 2 + abs(I(0,3) - I(3,4))\} \times 0.25$$

$$gradD2\_high(2,2) = \begin{bmatrix} abs\{(I(0,2) \times 0.333 + I(0,3) \times 0.667) - I(1,3)\} + \\ abs\{(I(4,2) \times 0.333 + I(4,3) \times 0.667) - I(5,3)\} + \\ abs\{(I(2,0) \times 0.333 + I(2,1) \times 0.667) - I(3,1)\} + \\ abs\{(I(2,4) \times 0.333 + I(2,5) \times 0.667) - I(3,5)\} \end{bmatrix} \times 0.25$$

$$gradD2(2,2) = gradD2\_low(2,2) \times a_{D2} + gradD2\_high(2,2) \times b_{D2}$$

It should be noted that, in the above formula, $a_{D2}$ and $b_{D2}$ are predefined weighting coefficients.

As previously described, generally, when incident light passes through a lens, the signal level decreases at high-frequency components.

Therefore, it is desirable for the magnitude relationship of the weighting coefficients in the above formula to be $a_{D2} > b_{D2}$.

(Top-Right 67.5-Degree Direction (A3) Gradient: gradA3)

The example depicted in FIG. 13 depicts a top-right 67.5-degree direction (A3) gradient calculation processing example corresponding to the coordinate location (2, 2) in the 6×6 pixels depicted in FIG. 13.

The top-right 67.5-degree direction (A3) gradient is calculated on the basis of the following data.

Center component top-right 67.5-degree direction (A3) gradient: gradA3_center
High-frequency component top-right 67.5-degree direction (A3) gradient: gradA3_high It should be noted that, as depicted in FIG. 13, because it is not possible for the high-frequency component top-right 67.5-degree direction (A3) gradient, gradA3_high, to be directly calculated from the pixel values of an output image from the imaging element, the pixel value of a virtual pixel location in a predetermined calculation direction is calculated as an interpolated pixel value for a plurality of output pixel values, and this interpolated pixel value is applied to calculate the high-frequency component top-right 67.5-degree direction (A3) gradient, gradA3_high.

It should be noted that I(x,y) is the pixel value at the location of coordinate (x,y).

abs( ) represents an absolute value.

The top-right 67.5-degree direction (A3) gradient corresponding to the coordinate location (2, 2) in the 6×6 pixels depicted in FIG. 13, in other words gradA3(2, 2), is calculated in accordance with the following formula.

[Mathematical Formula 7]

$gradA3\_low(2,2) = \{abs(I(1,3) - I(2,0)) +$
$\qquad abs(I(2,4) - I(3,1) \times 2 + abs(I(3,5) - I(4,2))\} \times 0.25$ $gradA3\_high(2,2) =$ $\begin{bmatrix} abs\{(I(1,2) \times 0.333 + I(0,2) \times 0.667) - I(0,3)\} + \\ abs\{(I(5,2) \times 0.333 + I(4,2) \times 0.667) - I(4,3)\} + \\ abs\{(I(3,0) \times 0.333 + I(2,0) \times 0.667) - I(2,1)\} + \\ abs\{(I(3,4) \times 0.333 + I(2,4) \times 0.667) - I(2,5)\} \end{bmatrix} \times 0.25$ $gradA3(2,2) = gradA3\_low(2,2) \times a_{A3} + gradA3\_high(2,2) \times b_{A3}$ It should be noted that, in the above formula, $a_{A3}$ and $b_{A3}$ are predefined weighting coefficients.

As previously described, generally, when incident light passes through a lens, the signal level decreases at high-frequency components.

Therefore, it is desirable for the magnitude relationship of the weighting coefficients in the above formula to be $a_{A3} > b_{A3}$.

(Bottom-Right 67.5-Degree Direction (D3) Gradient: gradD3)

Figure 14:
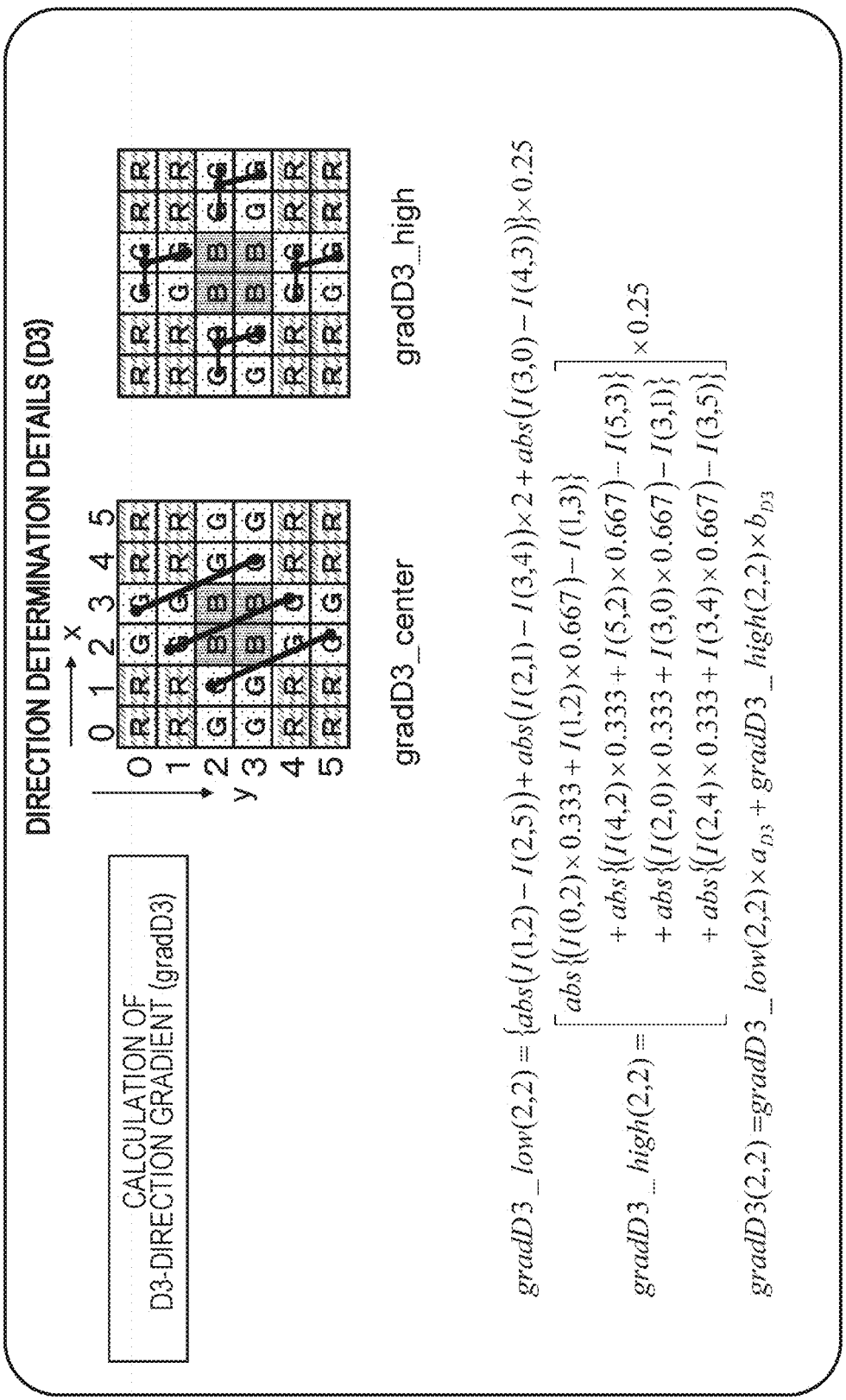
FIG. 14 is a drawing illustrating direction determination processing executed by the image processing device of the present disclosure.

The example depicted in FIG. 14 depicts a bottom-right 67.5-degree direction (D3) gradient calculation processing example corresponding to the coordinate location (2, 2) in the 6×6 pixels depicted in FIG. 14.

The bottom-right 67.5-degree direction (D3) gradient is calculated on the basis of the following data.
High-frequency component bottom-right 67.5-degree direction (D3) gradient: gradD3_high It should be noted that, as depicted in FIG. 14, because it is not possible for the high-frequency component bottom-right 67.5-degree direction (D3) gradient, gradD3_high, to be directly calculated from the pixel values of an output image from the imaging element, the pixel value of a virtual pixel location in a predetermined calculation direction is calculated as an interpolated pixel value for a plurality of output pixel values, and this interpolated pixel value is applied to calculate the high-frequency component bottom-right 67.5-degree direction (D3) gradient, gradD3_high.

It should be noted that I(x,y) is the pixel value at the location of coordinate (x,y).

abs( ) represents an absolute value.

The bottom-right 67.5-degree direction (D) gradient corresponding to the coordinate location (2, 2) in the 6×6 pixels depicted in FIG. 14, in other words gradD(2, 2), is calculated in accordance with the following formula.

[Mathematical Formula 8]

$gradD3\_low(2,2) = \{abs(I(1,2) - I(2,5)) +$
$\qquad abs(I(2,1) - I(3,4) \times 2 + abs(I(3,0) - I(4,3))\} \times 0.25$ $gradD3\_high(2,2) =$ $\begin{bmatrix} abs\{(I(0,2) \times 0.333 + I(1,2) \times 0.667) - I(1,3)\} + \\ abs\{(I(4,2) \times 0.333 + I(5,2) \times 0.667) - I(5,3)\} + \\ abs\{(I(2,0) \times 0.333 + I(3,0) \times 0.667) - I(3,1)\} + \\ abs\{(I(2,4) \times 0.333 + I(3,4) \times 0.667) - I(3,5)\} \end{bmatrix} \times 0.25$ $gradD3(2,2) = gradD3\_low(2,2) \times a_{D3} + gradD3\_high(2,2) \times b_{D3}$ It should be noted that, in the above formula, $a_{D3}$ and $b_{D3}$ are predefined weighting coefficients.

As previously described, generally, when incident light passes through a lens, the signal level decreases at high-frequency components.

Therefore, it is desirable for the magnitude relationship of the weighting coefficients in the above formula to be $a_{D3} > b_{D3}$.

The direction determination processing of step 202 of the flowchart of FIG. 4 has been described above.

Processing next advances to step S203, and G interpolation processing is executed. This is G interpolation processing for estimating and setting G pixel values for RB locations in the quadripartite Bayer-type RGB array image. At the time of this interpolation processing, interpolation processing is performed in which the pixel value gradient information calculated in step S151 is applied, and a pixel value in a direction having a small pixel value gradient serves as a reference pixel value.

A specific example of interpolation processing is described with reference to FIG. 15 and thereafter.

(Calculation Processing Example of an Interpolated Pixel in the Case of a 2, 2 Phase)

FIG. 15 depicts a processing example for calculating G-pixel interpolated pixel values for a B pixel location having a pixel location (2, 2) in the 6×6-pixel quadripartite Bayer-type RGB array image depicted in FIG. 15.

First, with respect to all eight directions in which gradient detection has been executed, interpolated pixel values, for which pixels of each of the directions serve as reference pixel values, are calculated. In other words, first, the following plurality of interpolated values are calculated:

an interpolated pixel value itp_GH for which pixels in the horizontal direction (H) serve as reference pixel values, an interpolated pixel value itp_GV for which pixels in the vertical direction (V) serve as reference pixel values, an interpolated pixel value itp_GA for which pixels in the top-right 45-degree direction (A) serve as reference pixel values, an interpolated pixel value itp_GD for which pixels in the bottom-right 45-degree direction (D) serve as reference pixel values, an interpolated pixel value itp_GA2 for which pixels in the top-right 22.5-degree direction (A2) serve as reference pixel values, an interpolated pixel value itp_GA3 for which pixels in the top-right 67.5-degree direction (A3) serve as reference pixel values, an interpolated pixel value itp_GD2 for which pixels in the bottom-right 22.5-degree direction (D2) serve as reference pixel values, and an interpolated pixel value itp_GD3 for which pixels in the bottom-right 67.5-degree direction (D3) serve as reference pixel values.

In addition, on the basis of these interpolated pixel values, processing for selecting a direction having a small gradient for example is performed, and blend processing of the above-mentioned calculated interpolated values that correspond to the selected direction and so forth is performed to decide a final interpolated value.

Calculation of the eight interpolated pixel values is executed in accordance with the following formula.

$$itp\_GH=I(1,2)\times 1.25-I(5,2)\times 0.25$$

$$itp\_GV=I(2,1)\times 1.25-I(2,5)\times 0.25$$

$$itp\_GA=I(1,3)\times 0.5+I(3,1)\times 0.5$$

$$itp\_GD=I(1,2)\times 0.375+I(3,4)\times 0.125+I(2,1)\times 0.375+I(4,3)\times 0.125$$

$$itp\_GA2=I(0,2)\times 0.1875+I(3,1)\times 0.3125+I(1,3)\times 0.3+I(4,2)\times 0.2$$

$$itp\_GD2=I(5,2)\times 0.225+I(2,1)\times 0.025+I(1,2)\times 0.525+I(4,3)\times 0.225$$

$$itp\_GA3=I(2,0)\times 0.2+I(1,3)\times 0.3+I(3,1)\times 0.1875+I(2,4)\times 0.3125$$

$$itp\_GD3=I(2,1)\times 0.525+I(3,4)\times 0.225+I(1,2)\times 0.225+I(2,5)\times 0.025 \quad \text{[Mathematical Formula 9]}$$

(Calculation Processing Example of an Interpolated Pixel in the Case of a 3, 2 Phase)

FIG. 16 depicts a processing example for calculating G-pixel interpolated pixel values for a B pixel location having a pixel location (3, 2) in the 6×6-pixel quadripartite Bayer-type RGB array image depicted in FIG. 16.

First, with respect to all eight directions in which gradient detection has been executed, interpolated pixel values, for which pixels of each of the directions serve as reference pixel values, are calculated. In other words, first, the following plurality of interpolated values are calculated:

an interpolated pixel value itp_GH for which pixels in the horizontal direction (H) serve as reference pixel values, an interpolated pixel value itp_GV for which pixels in the vertical direction (V) serve as reference pixel values, an interpolated pixel value itp_GA for which pixels in the top-right 45-degree direction (A) serve as reference pixel values, an interpolated pixel value itp_GD for which pixels in the bottom-right 45-degree direction (D) serve as reference pixel values, an interpolated pixel value itp_GA2 for which pixels in the top-right 22.5-degree direction (A2) serve as reference pixel values, an interpolated pixel value itp_GA3 for which pixels in the top-right 67.5-degree direction (A3) serve as reference pixel values, an interpolated pixel value itp_GD2 for which pixels in the bottom-right 22.5-degree direction (D2) serve as reference pixel values, and an interpolated pixel value itp_GD3 for which pixels in the bottom-right 67.5-degree direction (D3) serve as reference pixel values.

In addition, on the basis of these interpolated pixel values, processing for selecting a direction having a small gradient for example is performed, and blend processing of the above-mentioned calculated interpolated values that correspond to the selected direction and so forth is performed to decide a final interpolated value.

Calculation of the eight interpolated pixel values is executed in accordance with the following formula.

$$itp\_GH=I(4,2)\times 1.25-I(0,2)\times 0.25$$

$$itp\_GV=I(3,1)\times 1.25-I(3,5)\times 0.25$$

$$itp\_GA=I(3,1)\times 0.375+I(1,3)\times 0.125+I(4,2)\times 0.375+I(2,4)\times 0.125$$

$$itp\_GD=I(2,1)\times 0.5+I(4,3)\times 0.5$$

$$itp\_GA2=I(0,2)\times 0.025+I(3,1)\times 0.225+I(1,3)\times 0.225+I(4,2)\times 0.525$$

$$itp\_GD2=I(5,2)\times 0.3125+I(2,1)\times 0.1875+I(1,2)\times 0.2+I(4,3)\times 0.3$$

$$itp\_GA3=I(3,1)\times 0.525+I(2,4)\times 0.225+I(4,2)\times 0.225+I(3,5)\times 0.025$$

$$itp\_GD3=I(2,1)\times 0.3125+I(3,4)\times 0.1875+I(3,0)\times 0.2+I(4,3)\times 0.3 \quad \text{[Mathematical Formula 10]}$$

(Calculation Processing Example of an Interpolated Pixel in the Case of a 2, 3 Phase)

Figure 17:
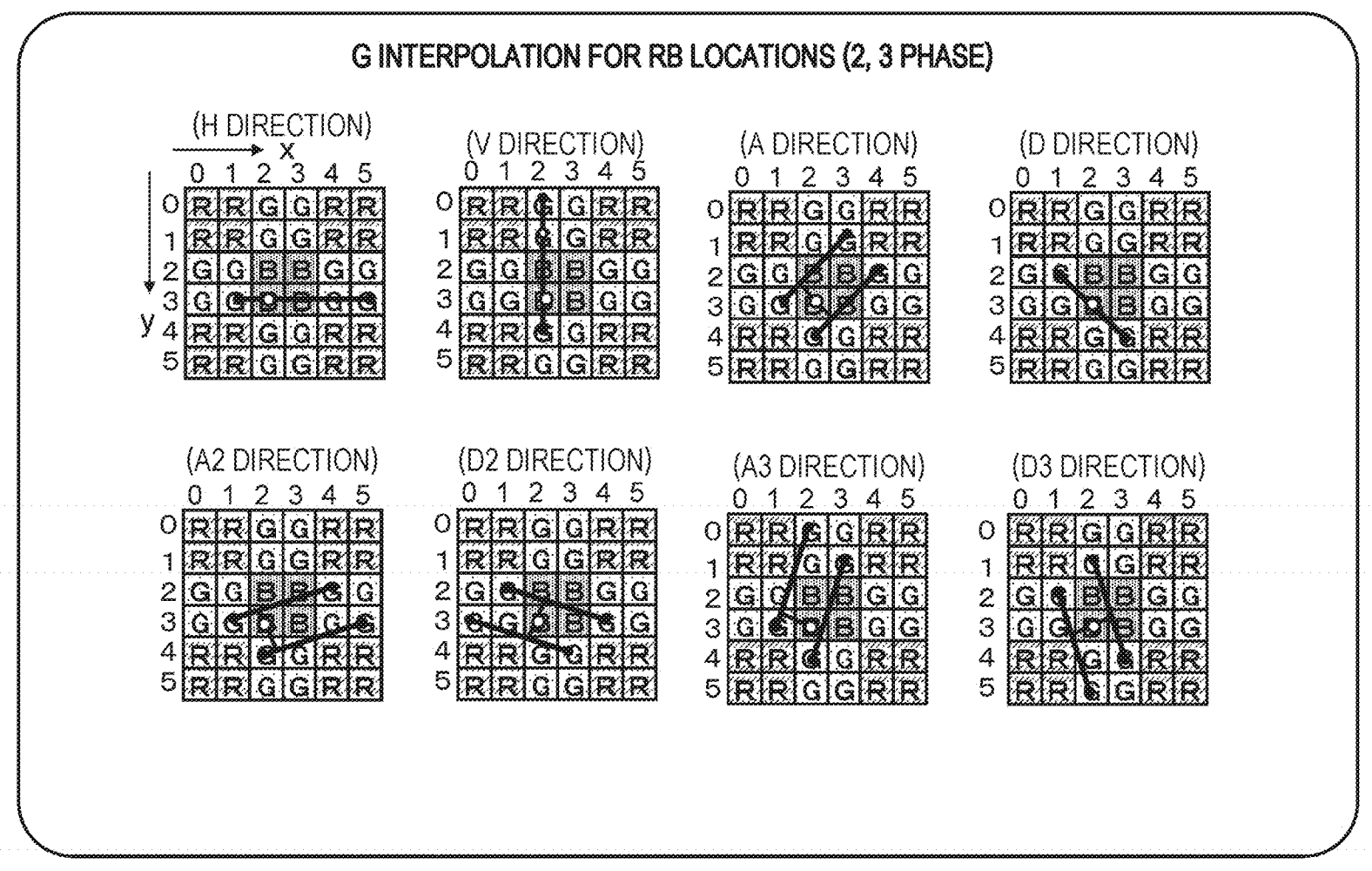

FIG. 17 depicts a processing example for calculating G-pixel interpolated pixel values for a B pixel location having a pixel location (2, 3) in the 6×6-pixel quadripartite Bayer-type RGB array image depicted in FIG. 17.

First, with respect to all eight directions in which gradient detection has been executed, interpolated pixel values, for which pixels of each of the directions serve as reference pixel values, are calculated. In other words, first, the following plurality of interpolated values are calculated:

an interpolated pixel value itp_GH for which pixels in the horizontal direction (H) serve as reference pixel values, an interpolated pixel value itp_GV for which pixels in the vertical direction (V) serve as reference pixel values, an interpolated pixel value itp_GA for which pixels in the top-right 45-degree direction (A) serve as reference pixel values, an interpolated pixel value itp_GD for which pixels in the bottom-right 45-degree direction (D) serve as reference pixel values, an interpolated pixel value itp_GA2 for which pixels in the top-right 22.5-degree direction (A2) serve as reference pixel values, an interpolated pixel value itp_GA3 for which pixels in the top-right 67.5-degree direction (A3) serve as reference pixel values, an interpolated pixel value itp_GD2 for which pixels in the bottom-right 22.5-degree direction (D2) serve as reference pixel values, and an interpolated pixel value itp_GD3 for which pixels in the bottom-right 67.5-degree direction (D3) serve as reference pixel values.

In addition, on the basis of these interpolated pixel values, processing for selecting a direction having a small gradient for example is performed, and blend processing of the abovementioned calculated interpolated values that correspond to the selected direction and so forth is performed to decide a final interpolated value.

(Calculation Processing Example of an Interpolated Pixel in the Case of a 3, 3 Phase)

Figure 18:
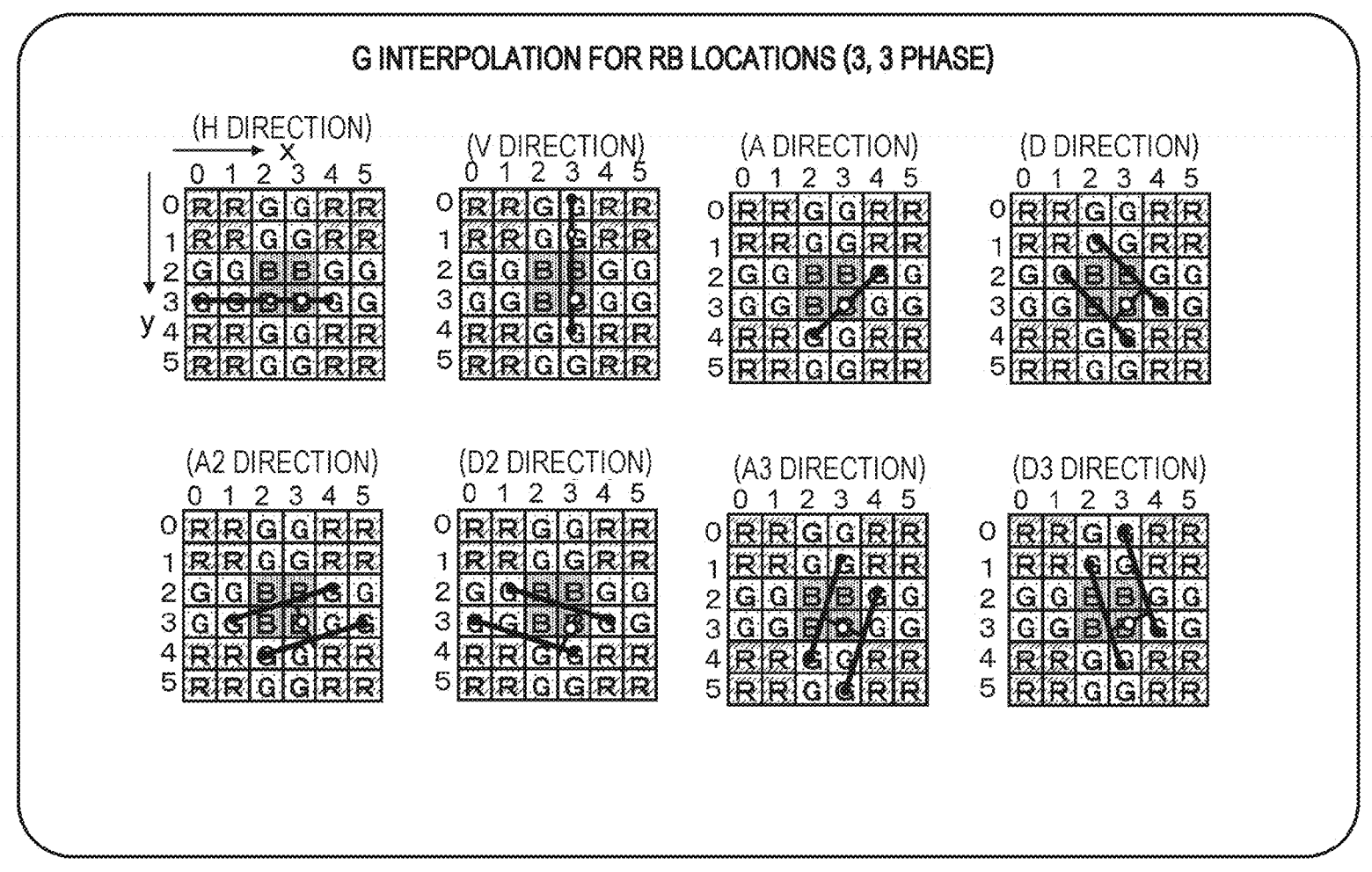

FIG. 18 depicts a processing example for calculating G-pixel interpolated pixel values for a B pixel location having a pixel location (3, 3) in the 6×6-pixel quadripartite Bayer-type RGB array image depicted in FIG. 18.

First, with respect to all eight directions in which gradient detection has been executed, interpolated pixel values, for which pixels of each of the directions serve as reference pixel values, are calculated. In other words, first, the following plurality of interpolated values are calculated:

an interpolated pixel value itp_GH for which pixels in the horizontal direction (H) serve as reference pixel values, an interpolated pixel value itp_GV for which pixels in the vertical direction (V) serve as reference pixel values, an interpolated pixel value itp_GA for which pixels in the top-right 45-degree direction (A) serve as reference pixel values, an interpolated pixel value itp_GD for which pixels in the bottom-right 45-degree direction (D) serve as reference pixel values, an interpolated pixel value itp_GA2 for which pixels in the top-right 22.5-degree direction (A2) serve as reference pixel values, an interpolated pixel value itp_GA3 for which pixels in the top-right 67.5-degree direction (A3) serve as reference pixel values, an interpolated pixel value itp_GD2 for which pixels in the bottom-right 22.5-degree direction (D2) serve as reference pixel values, and an interpolated pixel value itp_GD3 for which pixels in the bottom-right 67.5-degree direction (D3) serve as reference pixel values.

In addition, on the basis of these interpolated pixel values, processing for selecting a direction having a small gradient for example is performed, and blend processing of the abovementioned calculated interpolated values that correspond to the selected direction and so forth is performed to decide a final interpolated value.

(Selection of Final Interpolated Pixel Value from Interpolated Pixel Values Based on the Reference Pixels in the Eight Directions Calculated)

As described with reference to FIG. 15 to FIG. 18, G-pixel interpolated pixel values in the pixel location of an R or B pixel in the quadripartite Bayer-type RGB array image are, with respect to all eight directions in which gradient detection has been executed, calculated as interpolated pixel values for which pixels in each of the directions serve as reference pixel values.

In addition, on the basis of these interpolated pixel values, processing for selecting a direction having a small gradient for example is performed, and blend processing of the abovementioned calculated interpolated values that correspond to the selected direction and so forth is performed to decide a final interpolated value.

Artifacts increase if determination is erroneously made in an orthogonal direction, and therefore an algorithm for selecting the direction having a small gradient (grad) from orthogonal directions is applied.

For example, blend processing that uses interpolated pixel values corresponding to the direction selected in accordance with the abovementioned algorithm is executed to calculate a final interpolated pixel value.

Specifically, for example, if the largest value of gradHV, gradAD, and gradA2A3D2D3 is equal to or less than a threshold value, a smoothed signal of the surrounding pixels is output as an interpolated pixel value. (Noise countermeasure for flat sections)

When gradA2A3D2D3 is the smallest value, interpolation is performed from those directions, and in other cases, interpolated values are blended in accordance with the values of gradHV and gradAD.

A final interpolated pixel value is calculated in accordance with this kind of processing.

Returning to the flow of FIG. 4, the explanation regarding the remosaic processing sequence for converting a quadripartite Bayer-type RGB array image into a Bayer array image is continued.

In step S203, when the G interpolation processing that is processing for setting a G pixel value for an RB pixel location finishes, processing advances to step S204.

In step S204, it is determined whether or not the pixel location in question is a G estimation pixel location for which estimation of a G pixel value has been performed. In other words, it is determined whether or not the pixel location in question is a pixel for which a G pixel value, calculated by means of subjecting a pixel location that was originally an RB pixel to interpolation processing, has been set. If the pixel location in question is a G estimation pixel location, processing moves to the output selection processing of step S213.

If the pixel location in question is not a G estimation pixel location, processing moves to step S205, and it is determined whether or not a false color is detected.

The false color detection processing of step S205 is described.

The quadripartite Bayer-type RGB array image is the same as the Bayer array image in that the RB sampling rate is low compared to G. Consequently, with regard to RB, aliasing is likely to occur in low-frequency bands.

For example, in contrast to G in which aliasing does not occur and there is a high-frequency component in ½ of the Nyquist frequency, in other words in ½ Nq, in RB the high-frequency component is lost due to aliasing. Aliasing is detected by using this and comparing the Laplacians for appropriate bands of a G signal and an RB signal.

Specifically, for example, G_lpl and RB_lpl are calculated by means of gradients (or Laplacians (lpl)) in which ½ of the Nyquist frequency, in other words ½ Nq, can be detected, and the difference therebetween is used for detection.

If a false color is detected in step S205, false color correction is executed in step S206. Known processing can be applied for the false color correction processing.

A specific example of false color correction is described. With regard to false color correction, for example, in an ISP, an LMTX for the detection region is weakly applied. Alternatively, in the processing in a CIS, processing such as achromatization can be applied by means of reverse WB.

After the false color correction in step S206, processing advances to step S207, and RB estimation processing is executed. This processing is processing for setting RB in RGB locations in the quadripartite Bayer-type RGB array required to convert the quadripartite Bayer-type RGB array image into a Bayer array image.

A specific example of this RB estimation processing is described with reference to FIG. 19.

In this RB estimation processing, as depicted in FIG. 19, interpolation processing based also on the estimation that there is a correlation between the pixel values of G pixels and the pixel values of RB pixels in a local region, for example a local region of 7×7 pixels, is executed; in other words, color correlation interpolation processing is executed.

Next, processing is described for the case where, in step S201 in the flow of FIG. 4, it is determined that the processing-target pixel is a G pixel.

In this case, processing advances to step S211.

In step S211, the processing is the same as step S204, in other words, it is determined whether or not the pixel location in question is a G estimation pixel location for which estimation of a G pixel value has been performed. In other words, it is determined whether or not the pixel location in question is a pixel for which a G pixel value, calculated by means of subjecting a pixel location that was originally an RB pixel to interpolation processing, has been set. If the pixel location in question is a G estimation pixel location, processing moves to the output selection processing of step S213.

If the determination is "no", processing advances to step S212.

In step S212, RB estimation processing that is the same as step S207 is executed.

In this RB estimation processing, as depicted in FIG. 19, interpolation processing based on the estimation that there is a correlation between the pixel values of G pixels and the pixel values of RB pixels in a local region is executed; in other words, color correlation interpolation processing is executed.

In step S213, selection processing for an output pixel is performed. In other words, from the results of:

"yes" in step S204, the processing result of step S207,

"yes" in step S211, and the processing result of step S212, pixel values corresponding to a Bayer array are selected and serve as output pixels.

In step S214, it is determined whether or not the processing for all processing-target pixels has been completed. If there remain pixels for which processing is not complete, the processing of step S201 and thereafter is executed for the unprocessed pixels.

The processing is finished on the basis of the determination that all pixel processing has been completed. [5. Summary of the Configuration of the Present Disclosure]

An embodiment of the present disclosure has been described above in detail with reference to a specific embodiment. However, it is obvious that a person skilled in the art could amend or substitute the embodiment without deviating from the gist of the present disclosure. In other words, the present invention has been disclosed in the form of an exemplification, and should not be interpreted in a restrictive manner. The claims section should be taken into consideration when determining the gist of the present disclosure.

It should be noted that the technology disclosed in the present description can also have a configuration such as the following.

(1) An image processing device including an image signal correction unit that executes correction processing for a pixel signal of an input image, wherein the image signal correction unit inputs, as the input image, a mosaic image in which pixel blocks configured of a plurality of same-color pixels are arrayed, from among constituent pixels of the input image, detects pixel value gradients in eight directions in a conversion-target pixel location that is targeted for color conversion processing, decides an interpolated pixel value calculation mode for the conversion-target pixel on the basis of the pixel value gradients in the eight directions, and calculates an interpolated pixel value for the conversion-target pixel location in accordance with the decided processing mode.

(2) The image processing device according to (1), wherein the image signal correction unit executes remosaic processing for inputting, as the input image, a mosaic image in which pixel blocks configured of a plurality of same-color pixels are arrayed, and converting the pixel array of the input image into a different pixel array, and the image signal correction unit, in the remosaic processing, from among constituent pixels of the input image, detects pixel value gradients in eight directions in a conversion-target pixel location that is targeted for color conversion processing, decides an interpolated pixel value calculation mode for the conversion-target pixel on the basis of the pixel value gradients in the eight directions, and calculates an interpolated pixel value for the conversion-target pixel location in accordance with the decided processing mode.

(3) The image processing device according to (1) or (2), wherein the image signal correction unit executes remosaic processing for inputting, as the input image, an image having a quadripartite Bayer-type RGB array in which colors of a Bayer-type RGB array are implemented as an array of 2×2 pixel units, and converting the input image into a Bayer array.

(4) The image processing device according to any of (1) to (3), wherein the image signal correction unit executes processing for selecting pixels in a direction having a small gradient, as reference pixels on the basis of the pixel value gradients in the eight directions, and calculating an interpolated pixel value for the conversion-target pixel by means of blend processing of the pixel values of the selected reference pixels.

(5) The image processing device according to any of (1) to (4), wherein, in the case where the largest value of the pixel value gradients in the eight directions is equal to or less than a predetermined threshold value, the image signal correction unit executes processing for calculating, as an interpolated pixel value for the conversion-target pixel, a smoothed signal based on the pixel values of the pixels surrounding the conversion-target pixel.

(6) The image processing device according to any of (1) to (5), wherein the image signal correction unit, in the calculation processing for the pixel value gradients in the eight directions, when calculating a gradient in at least one direction, calculates low-frequency component gradient information in which pixels of the same color included in the input image are applied, high-frequency component gradient information in which pixels of the same color included in the input image are applied, and different-color component gradient information in which pixels of different colors included in the input image are applied, and calculates a pixel value gradient by weighted addition of the three items of gradient information.

(7) The image processing device according to any of (1) to (6), wherein the image signal correction unit, in the calculation processing for the pixel value gradients in the eight directions, when calculating a gradient in at least one direction, calculates a low-frequency component gradient in which pixels of the same color included in the input image are applied, a high-frequency component gradient in which pixels of the same color included in the input image are applied, and a mid-frequency component gradient in which pixels of the same color included in the input image are applied, and calculates a pixel value gradient by weighted addition of the three items of gradient information.

(8) The image processing device according to any of (1) to (7), wherein the image signal correction unit, in the calculation processing for the pixel value gradients in the eight directions, when calculating a gradient in at least one direction, calculates a low-frequency component gradient in which pixels of the same color included in the input image are applied, and a high-frequency component gradient in which pixels of the same color included in the input image are applied, and calculates a pixel value gradient by weighted addition of the two items of gradient information.

(9) The image processing device according to any of (1) to (8), wherein the image signal correction unit, in the calculation processing for the pixel value gradients in the eight directions, when calculating gradients in a vertical direction and a horizontal direction, calculates low-frequency component gradient information in which pixels of the same color included in the input image are applied, high-frequency component gradient information in which pixels of the same color included in the input image are applied, and different-color component gradient information in which pixels of different colors included in the input image are applied, and calculates a pixel value gradient by weighted addition of the three items of gradient information, when calculating gradients in a top-right 45-degree direction and a bottom-right 45-degree direction, calculates low-frequency component gradient information in which pixels of the same color included in the input image are applied, high-frequency component gradient information in which pixels of the same color included in the input image are applied, and mid-frequency component gradient information in which pixels of the same color included in the input image are applied, and calculates a pixel value gradient by weighted addition of the three items of gradient information, and when calculating gradients in a top-right 22.5-degree direction, a bottom-right 22.5-degree direction, a top-right 67.5-degree direction, and a bottom-right 67.5-degree direction, calculates low-frequency component gradient information in which pixels of the same color included in the input image are applied, and high-frequency component gradient information in which pixels of the same color included in the input image are applied, and calculates a pixel value gradient by weighted addition of the two items of gradient information.

(10) The image processing device according to any of (1) to (9), wherein the image signal correction unit executes interpolated pixel value calculation processing in which reference pixel locations are altered in accordance with constituent pixel locations of the pixel blocks configured of the plurality of same-color pixels.

In addition, a method for the processing executed in the abovementioned device and system, a program that causes the processing to be executed, and a recording medium having the program recorded thereon are also included in the configuration of the present disclosure.

Furthermore, the series of processing described in the description can be executed by hardware, or software, or alternatively a combined configuration of both. In the case where processing by means of software is executed, the program in which the processing sequence is recorded can be installed in and executed from a memory in a computer incorporated in dedicated hardware, or the program can be installed in and executed by a general-purpose computer on which the various kinds of processing can be executed. For example, the program can be recorded in advance on a recording medium. Other than being installed on a computer from a recording medium, the program can be received via a network such as a LAN (local area network) or the Internet, and installed on a recording medium such as a hard disk that is provided internally.

It should be noted that the various kinds of processing described in the description may not only be executed in a time-sequential manner in accordance with that described, but may also be executed in a parallel or discrete manner in accordance with the processing capabilities of the device that executes processing or as required. Furthermore, a system in the present description is a logical set configuration of a plurality of devices, and is not restricted to the constituent devices being in the same enclosure.

INDUSTRIAL APPLICABILITY

As described above, according to the configuration of an embodiment of the present disclosure, a device and a method for executing remosaic processing for performing conversion into an image of a difference pixel array are realized.

Specifically, remosaic processing for inputting, as an input image, a mosaic image in which pixel blocks configured of a plurality of same-color pixels are arrayed, and converting the pixel array of the input image into a different pixel array is executed. In this remosaic processing, from among constituent pixels of the input image, pixel value gradients in eight directions in a conversion-target pixel location that is targeted for color conversion processing are detected, an interpolated pixel value calculation mode for the conversion-target pixel is decided on the basis of the pixel value gradients in the eight directions, and an interpolated pixel value for the conversion-target pixel location is calculated in accordance with the decided processing mode. For example, an image having a quadripartite Bayer-type RGB array in which colors of a Bayer-type RGB array are implemented as an array of 2×2 pixel units is converted into a Bayer array.

REFERENCE SIGNS LIST

100 Imaging device
105 Optical lens
110 Imaging element (image sensor)
120 Image processing unit
130 Memory
140 Control unit
181 RGB array
183 Color image
200 Image signal correction unit

The invention claimed is:

1. An image processing device comprising an image signal correction unit that executes correction processing for a pixel signal of an input image, wherein the image signal correction unit inputs, as the input image, a mosaic image in which pixel blocks configured of a plurality of same-color pixels are arrayed, from among constituent pixels of the input image, detects pixel value gradients in eight directions in a conversion-target pixel location that is targeted for color conversion processing, decides an interpolated pixel value calculation mode for the conversion-target pixel on the basis of the pixel value gradients in the eight directions, and calculates an interpolated pixel value for the conversion-target pixel location in accordance with the decided processing mode;

wherein the image signal correction unit, in the calculation processing for the pixel value gradients in the eight directions, when calculating a gradient in at least one direction, calculates low-frequency component gradient information in which pixels of the same color included in the input image are applied, high-frequency component gradient information in which pixels of the same color included in the input image are applied, and different-color component gradient information in which pixels of different colors included in the input image are applied, and calculates a pixel value gradient by weighted addition of the three items of gradient information.

2. The image processing device according to claim 1, wherein the image signal correction unit executes remosaic processing for inputting, as the input image, a mosaic image in which pixel blocks configured of a plurality of same-color pixels are arrayed, and converting the pixel array of the input image into a different pixel array, and the image signal correction unit, in the remosaic processing, from among constituent pixels of the input image, detects pixel value gradients in eight directions in a conversion-target pixel location that is targeted for color conversion processing, decides an interpolated pixel value calculation mode for the conversion-target pixel on the basis of the pixel value gradients in the eight directions, and calculates an interpolated pixel value for the conversion-target pixel location in accordance with the decided processing mode.

3. The image processing device according to claim 1, wherein the image signal correction unit executes remosaic processing for inputting, as the input image, an image having a quadripartite Bayer-type RGB array in which colors of a Bayer-type RGB array are implemented as an array of 2×2 pixel units, and converting the input image into a Bayer array.

4. The image processing device according to claim 1, wherein the image signal correction unit executes processing for selecting pixels in a direction having a small gradient, as reference pixels on the basis of the pixel value gradients in the eight directions, and calculating an interpolated pixel value for the conversion-target pixel by means of blend processing of the pixel values of the selected reference pixels.

5. The image processing device according to claim 1, wherein, in the case where the largest value of the pixel value gradients in the eight directions is equal to or less than a predetermined threshold value, the image signal correction unit executes processing for calculating, as an interpolated pixel value for the conversion-target pixel, a smoothed signal based on the pixel values of the pixels surrounding the conversion-target pixel.

6. The image processing device according to claim 1, wherein the image signal correction unit, in the calculation processing for the pixel value gradients in the eight directions, when calculating a gradient in at least one direction, calculates a low-frequency component gradient in which pixels of the same color included in the input image are applied, and a high-frequency component gradient in which pixels of the same color included in the input image are applied, and calculates a pixel value gradient by weighted addition of the two items of gradient information.

7. The image processing device according to claim 1, wherein the image signal correction unit executes interpolated pixel value calculation processing in which reference pixel locations are altered in accordance with constituent pixel locations of the pixel blocks configured of the plurality of same-color pixels.

8. An image processing device comprising an image signal correction unit that executes correction processing for a pixel signal of an input image, wherein the image signal correction unit inputs, as the input image, a mosaic image in which pixel blocks configured of a plurality of same-color pixels are arrayed, from among constituent pixels of the input image, detects pixel value gradients in eight directions in a conversion-target pixel location that is targeted for color conversion processing, decides an interpolated pixel value calculation mode for the conversion-target pixel on the basis of the pixel value gradients in the eight directions, and calculates an interpolated pixel value for the conversion-target pixel location in accordance with the decided processing mode;

wherein the image signal correction unit, in the calculation processing for the pixel value gradients in the eight directions, when calculating a gradient in at least one direction, calculates a low-frequency component gradient in which pixels of the same color included in the input image are applied, a high-frequency component gradient in which pixels of the same color included in the input image are applied, and a mid-frequency component gradient in which pixels of the same color included in the input image are applied, and calculates a pixel value gradient by weighted addition of the three items of gradient information.

9. An image processing device comprising an image signal correction unit that executes correction processing for a pixel signal of an input image, wherein the image signal correction unit inputs, as the input image, a mosaic image in which pixel blocks configured of a plurality of same-color pixels are arrayed, from among constituent pixels of the input image, detects pixel value gradients in eight directions in a conversion-target pixel location that is targeted for color conversion processing, decides an interpolated pixel value calculation mode for the conversion-target pixel on the basis of the pixel value gradients in the eight directions, and calculates an interpolated pixel value for the conversion-target pixel location in accordance with the decided processing mode, wherein the image signal correction unit, in the calculation processing for the pixel value gradients in the eight directions, when calculating gradients in a vertical direction and a horizontal direction, calculates low-frequency component gradient information in which pixels of the same color included in the input image are applied, high-frequency component gradient information in which pixels of the same color included in the input image are applied, and different-color component gradient information in which pixels of different colors included in the input image are applied, and calculates a pixel value gradient by weighted addition of the three items of gradient information, when calculating gradients in a top-right 45-degree direction and a bottom-right 45-degree direction, calculates low-frequency component gradient information in which pixels of the same color included in the input image are applied, high-frequency component gradient information in which pixels of the same color included in the input image are applied, and mid-frequency component gradient information in which pixels of the same color included in the input image are applied, and calculates a pixel value gradient by weighted addition of the three items of gradient information, and when calculating gradients in a top-right 22.5-degree direction, a bottom-right 22.5-degree direction, a top-right 67.5-degree direction, and a bottom-right 67.5-degree direction, calculates low-frequency component gradient information in which pixels of the same color included in the input image are applied, and high-frequency component gradient information in which pixels of the same color included in the input image are applied, and calculates a pixel value gradient by weighted addition of the two items of gradient information.

* * * * *